United States Patent [19]

Sandoval

[11] 4,012,047
[45] Mar. 15, 1977

[54] AUTOMATIC RECORD CHANGER

[75] Inventor: Secundino Rodriguez Sandoval, Mexico City, Mexico

[73] Assignee: Investigaciones Tecnologicas Electromecanicas y Electronicas, S.A., Mexico City, Mexico

[22] Filed: Mar. 5, 1975

[21] Appl. No.: 555,557

[52] U.S. Cl. .............................................. 274/10 R
[51] Int. Cl.² ........................................ G11B 15/00
[58] Field of Search ......................... 274/10 R, 10 S

[56] References Cited

UNITED STATES PATENTS

| | | | |
|---|---|---|---|
| 2,803,465 | 8/1957 | Dobrogowski et al. | 274/10 R |
| 2,818,263 | 12/1957 | Dale | 274/10 R |
| 2,974,962 | 3/1961 | Dale | 274/10 R |
| 3,162,449 | 12/1964 | Hansen | 274/10 R |
| 3,163,428 | 12/1964 | Laufer | 274/10 R |
| 3,342,499 | 9/1967 | Fukuda | 274/10 R |
| 3,490,772 | 1/1970 | Dennis | 274/10 R |
| 3,697,087 | 10/1972 | Takahashi | 274/10 R |

*Primary Examiner*—Richard E. Aegerter
*Assistant Examiner*—John W. Shepperd

[57] ABSTRACT

A record changer for phonograph records is fully automated for playing a plurality of records but uses a relatively small number of parts. The record changer includes a rotatable turntable, a spindle for holding a stack of records above the turntable, a tone arm assembly for playing the records, and a changer mechanism which is operably connected with the spindle and the tone arm assembly. The changer mechanism includes a cam wheel which is rotatable by the turntable when the record changer is started and after each record has been played, and a slide arm connected to the cam wheel for moving the tone arm to a start position. When the last record has been played, stop members movable by the cam wheel turn the unit off. The tone arm assembly includes a friction clutch which cooperates with a record size indicator mechanism to move the tone arm to the proper start position depending upon the size of the records being played.

11 Claims, 38 Drawing Figures

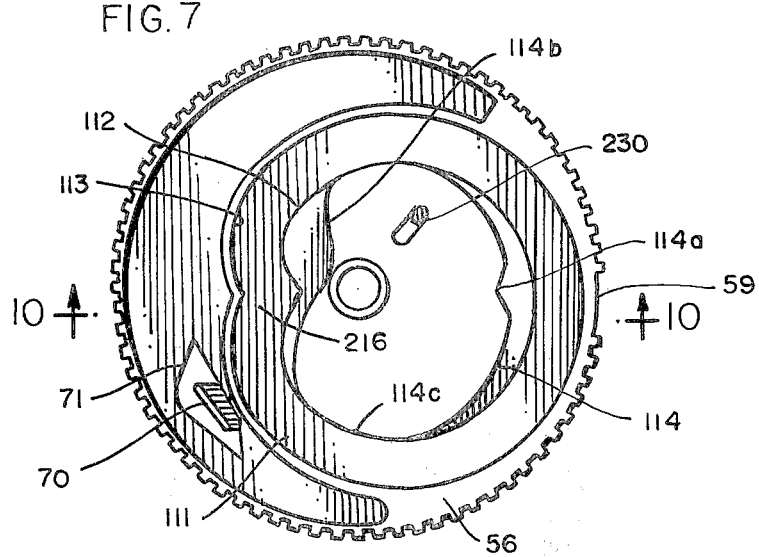
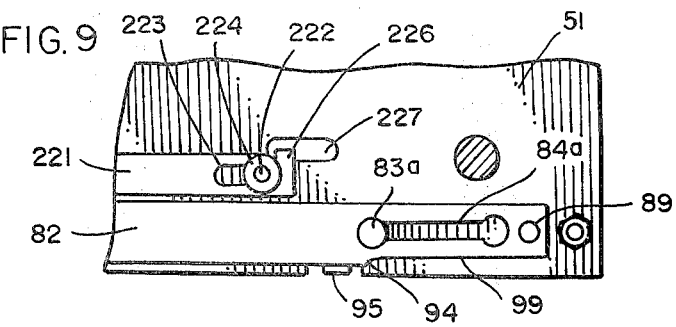
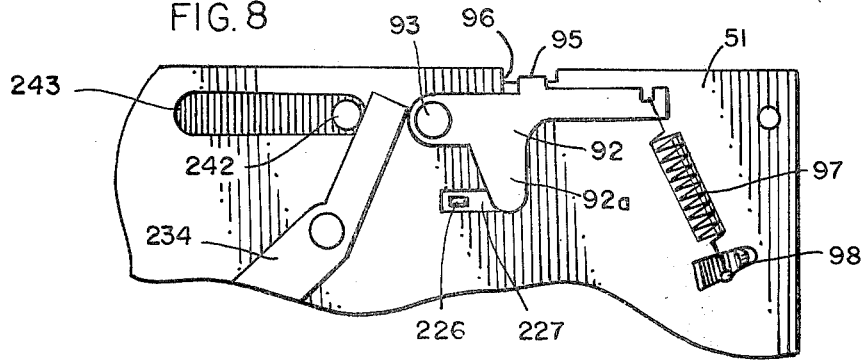
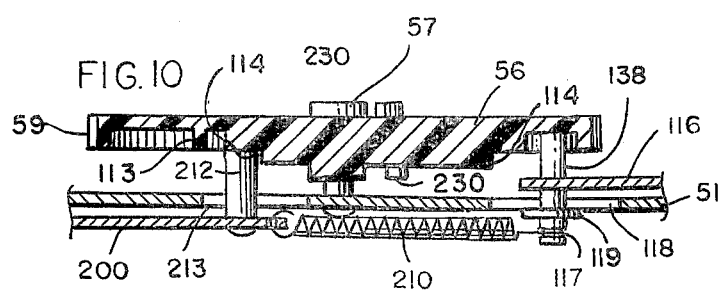

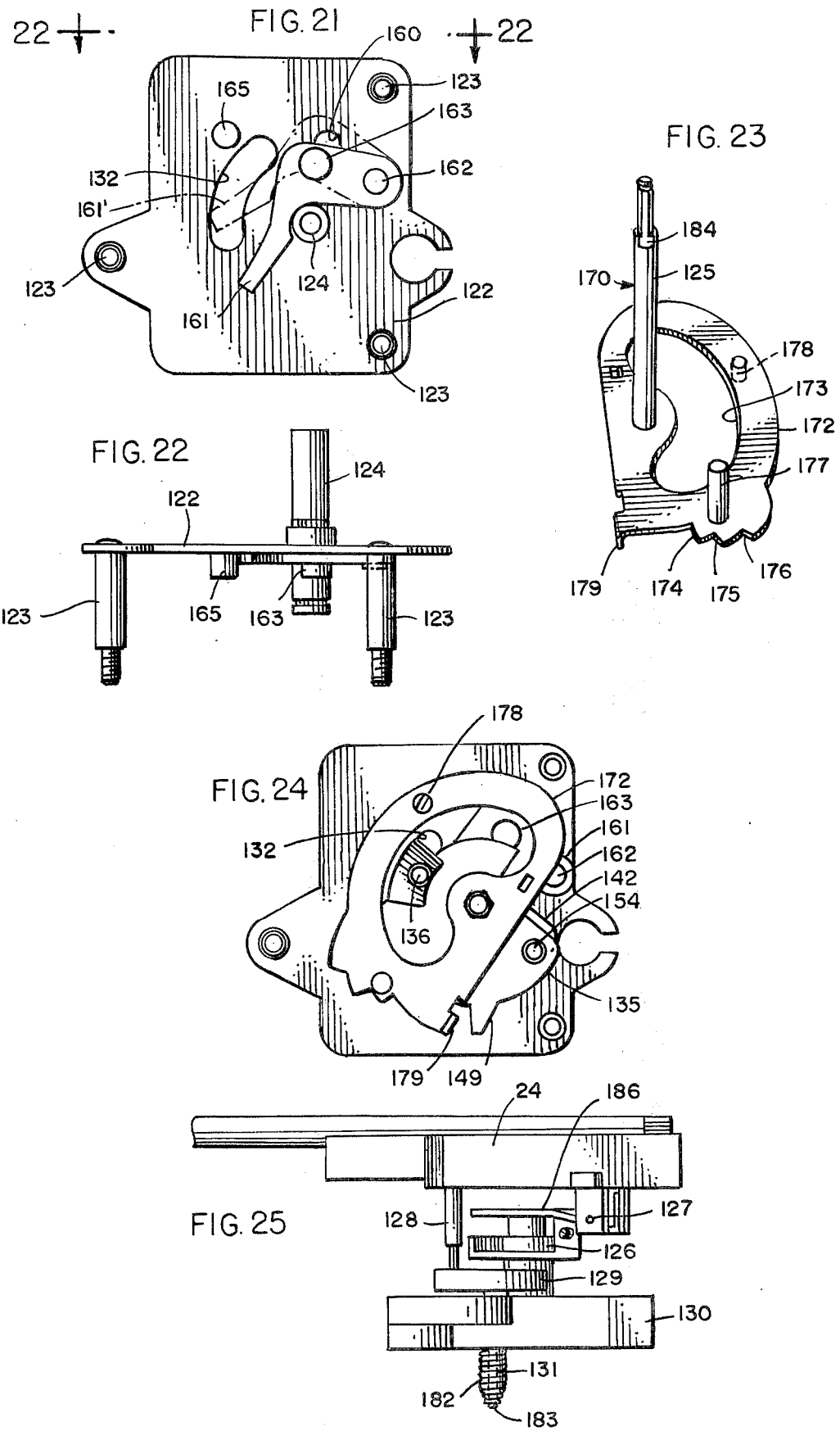

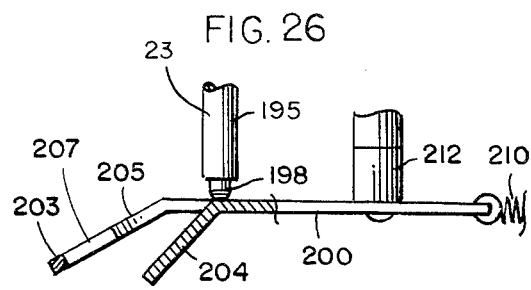
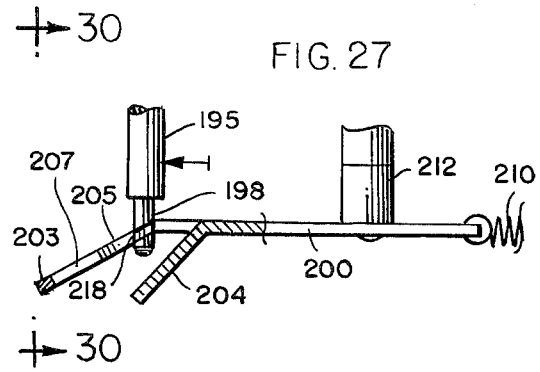
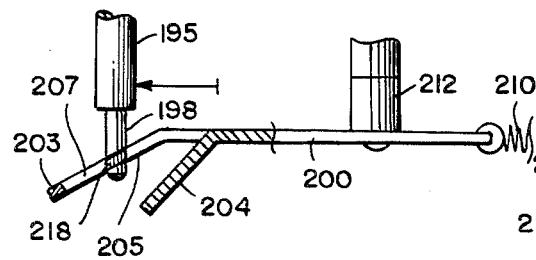
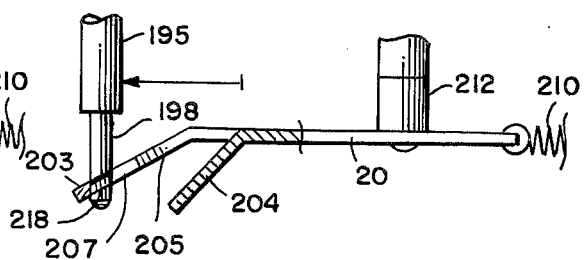
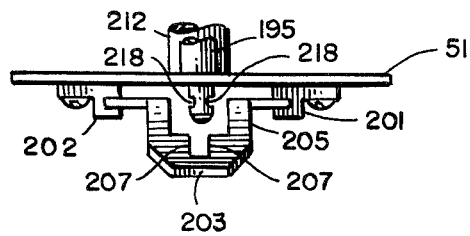
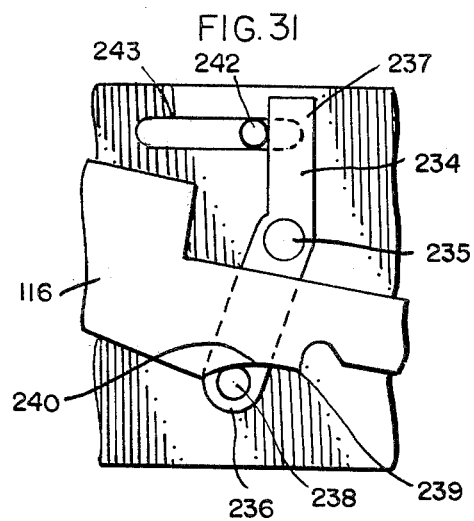
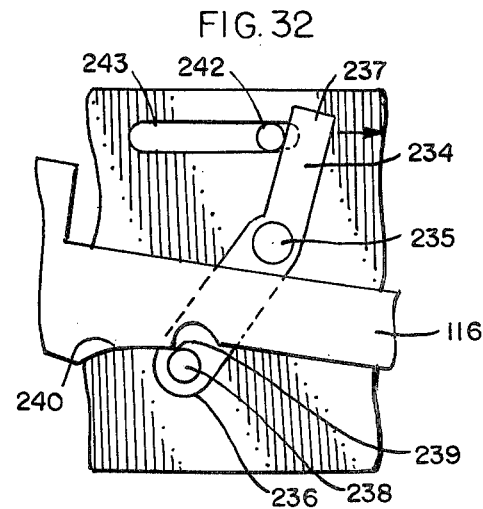

AUTOMATIC RECORD CHANGER

BACKGROUND AND SUMMARY

This invention relates to automatic record turntables or changers, and more particularly, to an automatic record changer which has relatively few parts and is therefore characterized by simple yet reliable operation.

The art on automatic record changers is voluminous. However, because of the variety of mechanical operations that are required to be performed by an automatic record changer, the operating mechanisms of the changer have generally been extremely complex, including a great number of interrelated movable parts. The complexity of the mechanisms not only increases the cost of the turntable because of parts and labor costs, but affects the reliability of the unit.

Each part of the unit represents a potential trouble spot or failure during operation, and if a part does fail, the complexity of the mechanism generally means increased repair costs.

The invention substantially reduces the complexity of prior art automatic record changers by using substantially fewer parts. The parts of the mechanism are interrelated in a unique way so that all of the usual operations of an automatic record changer are performed by fewer parts. The simplicity of the record changer permits the record changer to be made at substantially lower cost, increases the reliability of the record changer, and decreases service costs which may be required.

DESCRIPTION OF THE DRAWINGS

The invention will be explained in conjunction with an illustrative embodiment shown in the accompanying drawings, in which

FIG. 7 is a bottom plan view of the cam wheel;

FIG. 8 is an enlarged fragmentary view of a portion of FIG. 5;

FIG. 9 is a bottom plan view of a portion of the structure shown in FIG. 8;

FIG. 10 is a fragmentary sectional view through the cam wheel of FIG. 5;

FIG. 11 is a bottom plan view of the tone arm lift ramp and friction clutch taken along the line 11—11 of FIG. 3;

FIG. 12 is a side elevational view taken taken along the line 12—12 of FIG. 11;

FIG. 21 is a view similar to FIG. 11 with the friction clutch removed;

FIG. 22 is a side view taken along the line 22—22 of FIG. 21;

FIG. 23 is a perspective view of the tone arm shaft assembly;

FIG. 24 is a view similar to FIG. 11 with the tone arm shaft assembly in position;

FIG. 25 is a fragmentary elevational view of the tone arm taken generally along the line 25—25 of FIG. 1;

FIG. 26 is an enlarged fragmentary sectional view showing the lower end of the record spindle and cooperating slide member when the record changer is off or playing;

FIG. 27 is a view similar to FIG. 26 showing the spindle and slide when the slide begins to move to the right after a record has been played;

FIG. 28 is a view similar to FIG. 27 showing the spindle and slide after further movement of the slide and when another record is supported by the spindle;

FIG. 29 is a view similar to FIG. 28 showing the slide pulling the operating rod of the spindle;

FIG. 30 is a view taken along the line 30—30 of FIG. 27;

FIGS. 31 and 32 are fragmentary views similar to FIG. 8 showing movement of the slide arm toward the stop position;

DESCRIPTION OF SPECIFIC EMBODIMENT

Figure 1:
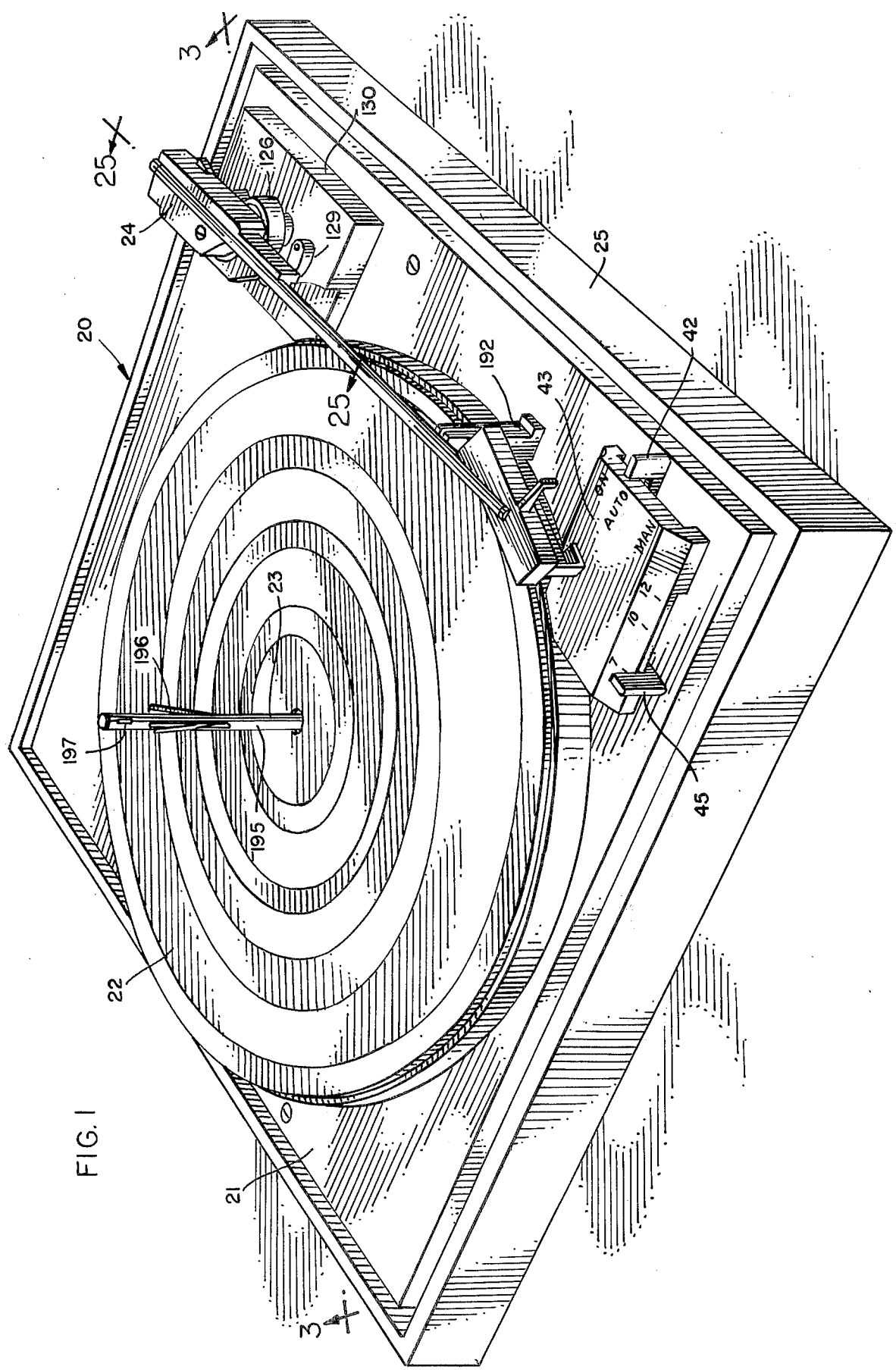
FIG. 1 is a perspective view of an automatic record changer embodying the invention.

Referring first to FIG. 1, the numeral 20 designates generally an automatic record changer which includes a frame 21, a turntable 22 for rotating records to be played, a spindle 23 in the center of the turntable for holding a stack of records, and a tone arm 24 for playing the records. The frame or base plate 21 is supported by a rectangular cabinet 25 of wood, plastic simulated wood, or the like.

Figure 2:
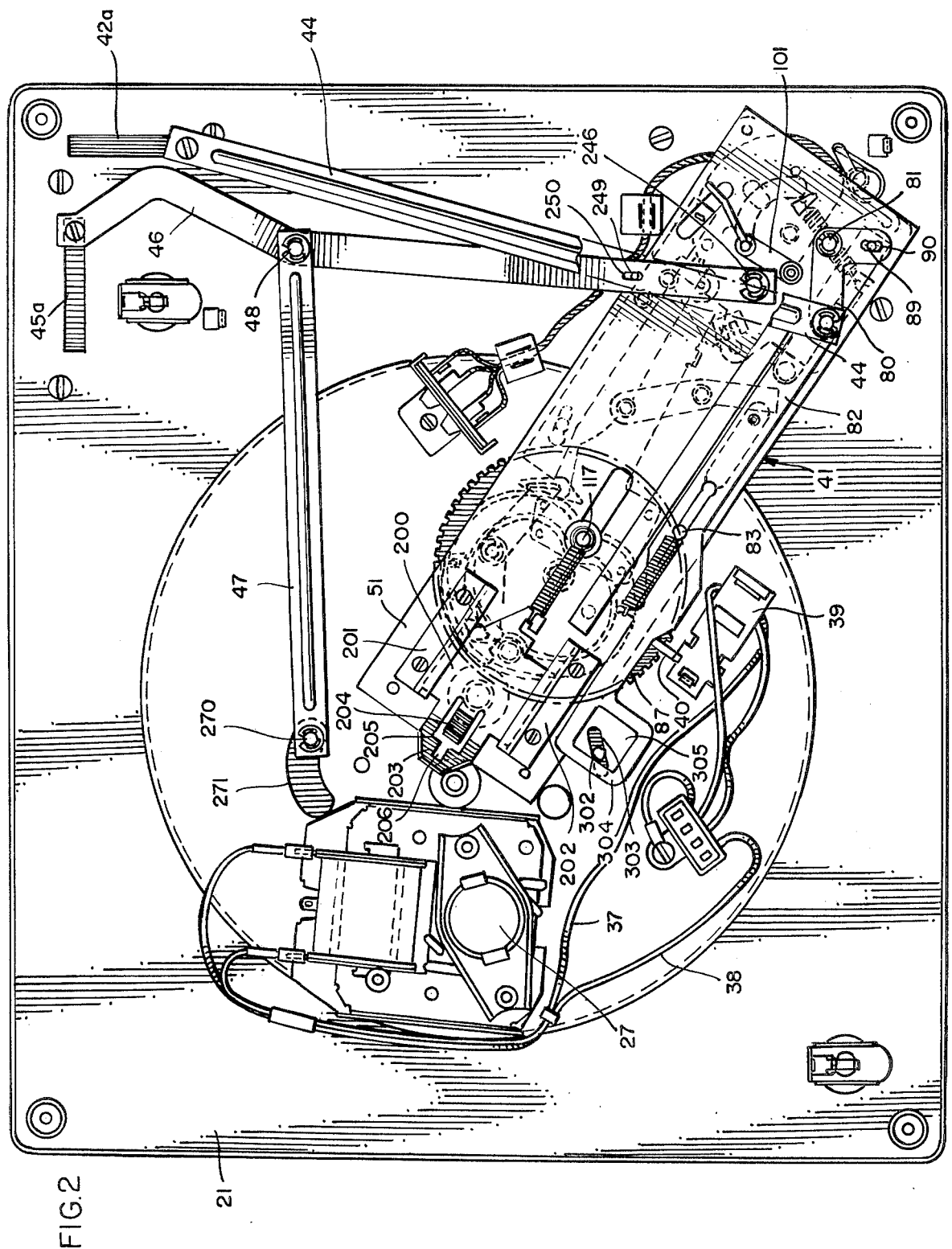
FIG. 2 is a bottom plan view of the record changer of FIG. 1.
Figure 3:
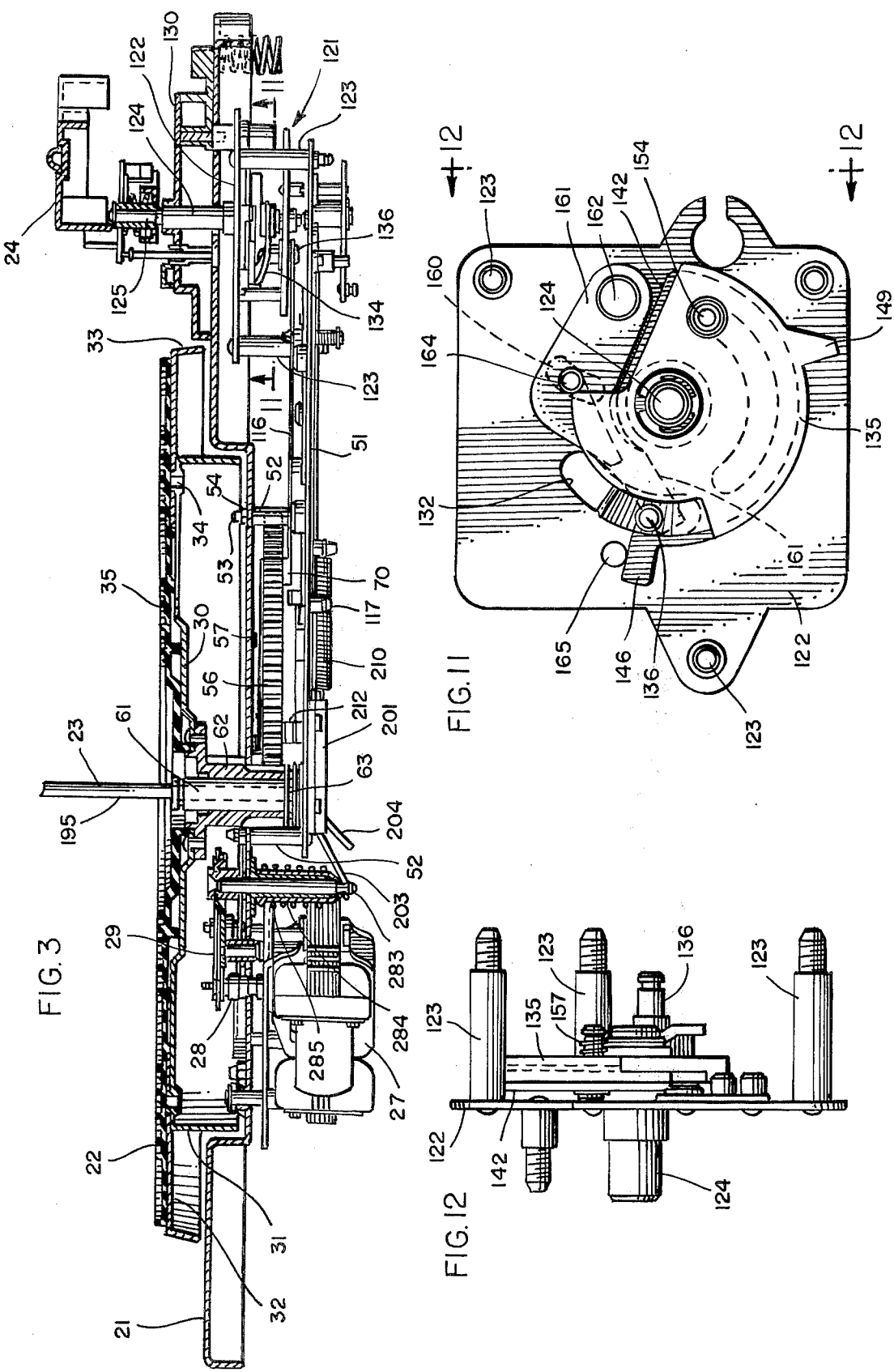
FIG. 3 is a sectional view taken along the line 3—3 of FIG. 1.

Referring now to FIGS. 2 and 3, the turntable is powered by an electric motor 27 which is mounted on the frame plate 21 and which includes a drive shaft 28 (FIG. 3) which extends upwardly through the frame plate into the space between the turntable and the frame plate. The drive connection between the drive shaft 28 and the turntable can take any of a number of conventional forms, all of which are well known in the art. In the particular embodiment illustrated in FIG. 3, the drive shaft 28 is engageable by a rubber wheel 29

Figure 37:
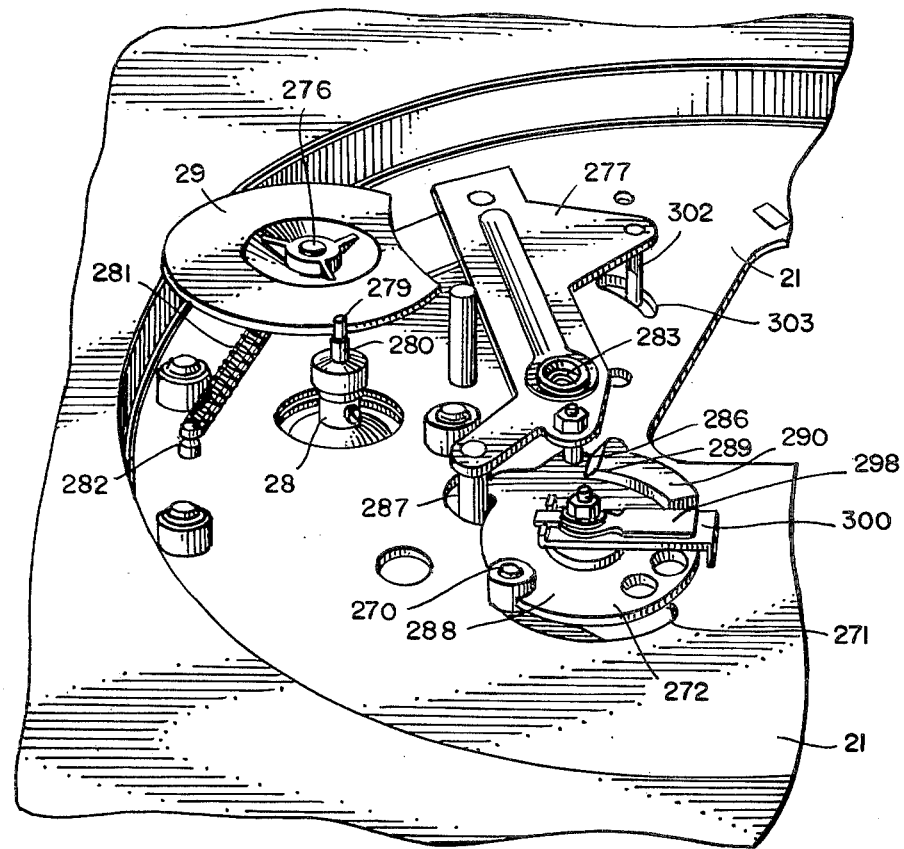
FIG. 37 is a fragmentary perspective view of the turntable drive and record size indicating means.

(see also FIG. 37). The rubber wheel is rotated by the drive shaft and, in turn, rotates the turntable.

The turntable includes an inner shell 30 having a downturned circular wall 31 which is drivingly engageable by the rubber wheel 29, and an annular outer shell 32 having a downturned peripheral flange 33. The inner and outer shells 30 and 32 are joined by rivets 34, and a rubber mat 35 overlies the inner and outer shells and frictionally holds the record which is being played.

Referring again to FIG. 2, electric current is supplied to the motor 27 by wires 37 and 38, and the wire 37 is connected to a switch 39 for energizing and de-energizing the motor. The switch includes a push button 40 which is movable from the OFF position shown in FIG. 2 to an ON position by a record changer assembly 41 which will be explained in detail hereinafter. Operation of the record changer assembly is initiated by a control arm 42 (FIG. 1), which is movable between OFF, AUTO (automatic), and MAN (manual or change) positions as indicated on the control arm housing 43 attached to the frame. The control arm 42 is slidably mounted in a slot 42a (FIG. 2) in the frame and is connected to a link 44 which connects the control arm to the record changer assembly.

Another control arm 45 (FIG. 1) is slidably mounted in a slot 45a (FIG. 2) in the frame below the housing 43 for adapting the record changer to play records of a particular diameter. The particular control arm illustrated is movable between a position for playing 33⅓ rpm records, which conventionally have a diameter of 10 or 12 inches, and a position for playing 45 rpm records, which conventionally have a diameter of 7 inches. Referring to FIG. 2, the control arm 45 is connected to link 46 which connects the control arm 45 to the record changer assembly, and a link 47 is pivotally connected to the link 46 by a pin 48 and controls the rotational speed of the turntable as will be explained in detail hereinafter.

Figure 5:
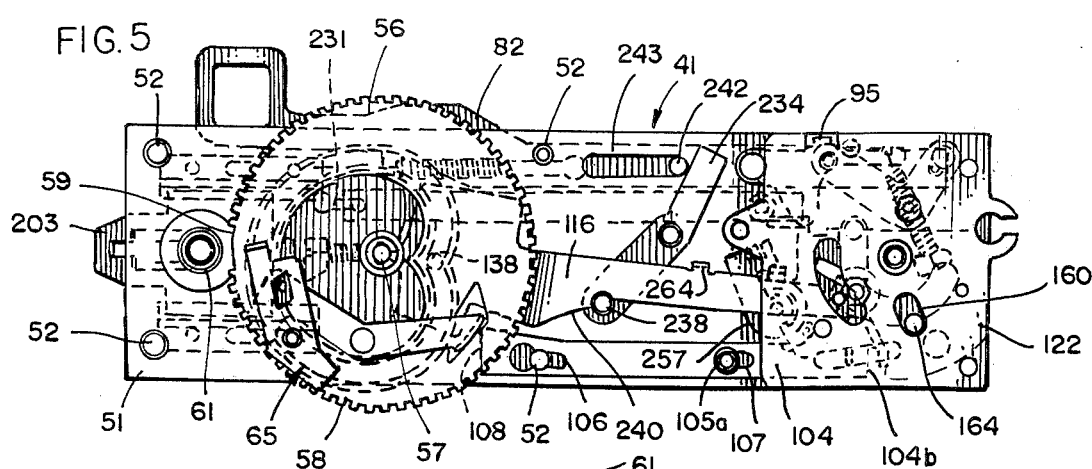
FIG. 5 is a top plan view of the record changer mechanism of FIG. 4.

Referring now to FIGS. 2 and 5, the record changer assembly 41 includes a rectangular, flat base plate 51, which is secured to the frame 21 by a plurality of vertically extending posts 52 (FIG. 3). Each post 52 includes an externally threaded upper end 53 of reduced diameter which extends through an opening in the frame plate, and a nut 54 is threadably engaged with the threaded end 53 and clamps the frame plate against the shoulder provided by the radially enlarged threaded portion of the support posts 52.

A cam wheel 56 is rotatably mounted on a shaft 57 secured to the base plate 51. The cam wheel 56 has a circular outer periphery with gear teeth 58 formed thereon, and the gear teeth extend continuouly around the periphery of the cam wheel except at a gapped or recessed portion 59 (FIGS. 5, 6 and 7), which has an outer periphery corresponding to the root diameter of the gear teeth.

A hollow cylindrical sleeve 61 (FIG. 3) is fixed to the base plate 51 and extends upwardly therefrom through an opening in the frame 21. The sleeve 61 rotatably supports a circular gear or boss 62 which is secured to the inner shell 30 of the turntable. The lower end of the boss 62 is supported for rotation by a thrust bearing 63 which surrounds the sleeve 61.

Figure 6:
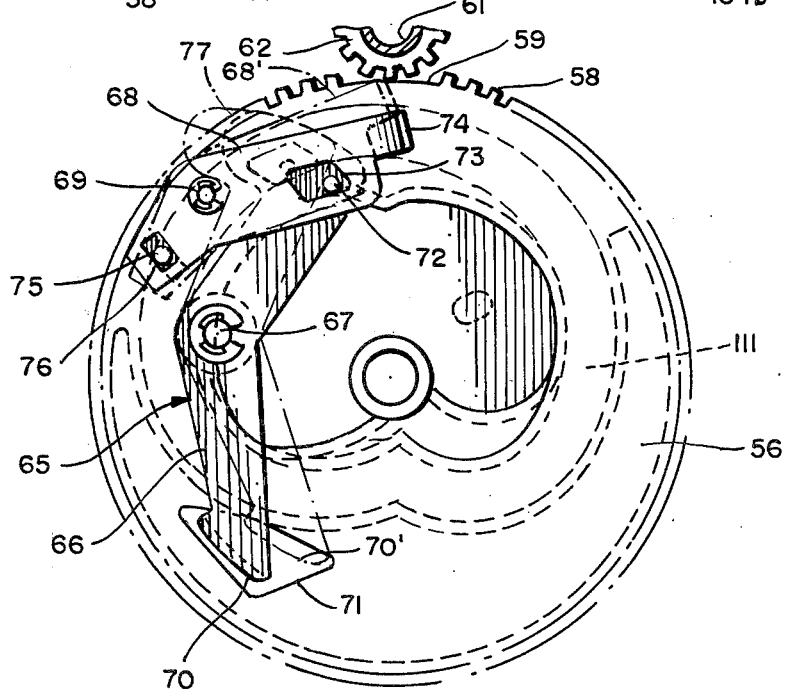
FIG. 6 is an enlarged fragmentary view of the cam wheel of FIG. 5 and the turntable boss.

Referring to FIG. 6, the turntable boss 62 is positioned adjacent the cam wheel 56, but when the recessed or gapped portion 59 of the periphery of the cam wheel is positioned adjacent the boss, the boss can rotate freely without rotating the cam wheel. However, if the cam wheel is rotated counter-clockwise slightly from the position of FIG. 6, the gear teeth of the cam wheel will mesh with the gear teeth of the boss and rotation of the turntable and the boss will rotate the cam for one complete revolution until the gapped portion of the cam wheel again comes into position opposite the boss.

An abutment mechanism 65 is carried by the cam wheel 56 for the purpose of causing the cam wheel to rotate sufficiently to engage the gear teeth of the boss. The abutment mechanism includes a bell crank 66 which is pivotally secured to the cam wheel by a pin 67 and a link 68 which is pivotally secured to the cam wheel by a pin 69. A flange 70 extends downwardly from one end of the bell crank 66 through an opening 71 in the cam wheel, and a pin 72 extends upwardly adjacent the other end of the bell crank through a generally rhombus-shaped opening 73 in the link 68. A flange or abutment 74 extends upwardly from one end of the link 68, and pivotal movement of the link 68 about the pin 69 is limited by a pin 75 which extends upwardly from the cam wheel through a rectangular opening 76 in the other end of the link.

When the bell crank and the link are in the positions illustrated in FIG. 6, the boss can rotate freely without rotating the cam wheel. However, when the flange 70 of the bell crank is caused to move to the position illustrated in phantom at 70′, the pin 72 of the bell crank will cause the link to move to the position indicated in the phantom at 68′. In this position, the abutment 74 on the link will engage the gear teeth of the boss as the boss rotates in a clockwise direction, and, since pivotal movement of the link is limited by the pin 75, the cam wheel will be forced to rotate counter-clockwise. Slight counter-clockwise rotation of the cam wheel will bring the gear teeth of the cam wheel into engagement with the gear teeth of the boss, and the boss will continue to rotate the cam wheel even after the abutment 74 moves away from the boss.

The bell crank 66 includes a rounded nose portion 77 which extends beyond the periphery of the cam wheel when the abutment 74 is moved into position to engage the boss. As the cam wheel nears the end of one complete revolution, the rounded nose portion engages the boss and is pushed inwardly to pivot the bell crank in a clockwise direction. The link 68 is secured to the cam wheel so that the bell crank is somewhat frictionally clamped between the link and the upper surface of the cam wheel, and clockwise rotation of the bell crank will also cause the link 68 to pivot clockwise about the pin 69 to bring the abutment 74 inside the periphery of the recessed portion 59 of the cam wheel. Accordingly, when the recessed portion 59 is rotated into the position illustrated in FIG. 6, the cam wheel 56 will come to rest, and the boss will continue to rotate without rotating the cam wheel until the abutment means is again engaged to move the abutment 74 into engagement with the boss.

Rotation of the turntable and the boss is initiated by moving the control arm 42 (FIG. 1) from the OFF position to the MAN position. This movement of the control arm 42 moves the upper end of the link 44 as viewed in FIG. 2 upwardly. The other end of the link 44 is pivotally connected to a bell crank 80 mounted below the base plate 51 by a pivot pin 81 which is secured to the base plate. The bell crank is caused to rotate clockwise by the link 44, and clockwise movement of the bell crank causes sliding movement of the switch arm 82. The switch arm 82 is slidably mounted below the base plate 51 by a pin 83 on the base plate which extends through an elongated slot 84 in the switch arm and by another pin 83a (FIG. 9) which is positioned below the bell crank 80 in FIGS. 2 and 3 and which extends through a similar elongated slot 84a in the switch arm.

The switch arm is biased to an OFF position by a coil spring 85 (FIG. 4) which extends between the pin 83 and a finger 86 on the switch arm. The switch arm is illustrated in its OFF position in FIG. 2, and in this position the switch button 40 engages a straight edge portion 87 (FIG. 4) of the switch arm. As the switch arm is moved to the left to the ON position, an inclined cam edge 88 on the switch arm forces the switch button 40 toward the switch to its ON position to energize the motor 77. The switch arm is moved by the bell crank by means of a pin 89 (FIGS. 2 and 9) which extends upwardly from the switch arm through a slot 90 in the bell crank.

The switch arm 82 is maintained in an ON position by a pivotal stop lever 92 (FIG. 8) which is pivotally mounted on the top of the base plate 51 by a pivot pin 93. The switch arm is provided with a stop shoulder 94 (FIG. 9) below the stop lever, and a stop finger 95 extends downwardly from the stop lever alongside the switch arm through a rectangular recess 96 in the base plate. The stop finger 95 is resiliently biased against the longitudinal edge of the switch arm by a coil spring 97 which extends between the end of the stop lever and an anchor pin 98 which is staked or punched from the base plate. When the switch arm is moved to the ON position by the link 44 and bell crank 80, the stop shoulder 94 is moved past the stop finger 95, and the spring 97 draws the stop finger against the edge portion 99 of the switch arm so that engagement of the stop shoulder 94 with the stop finger prevents the return of the switch arm to the OFF position.

Referring again to FIGS. 2 and 4, when the control arm 42 moves the link 44 upwardly to an ON position, the bell crank 80 rotates in a clockwise direction and ultimately engages a lever 101 which is pivotally mounted on the base plate 51 by a pin 102. The lever 101 includes a downwardly extending pin 103 which is engageable with the bell crank, and the other end of the lever arm is engageable with a finger 104a which extends downwardly from a slide arm 104 (FIG. 5) through an elongated slot 105 in the base plate. The slide arm 104 is slidably mounted on the upper surface of the base plate by one of the posts 52 and by a pin 105a, which extend through elongated slots 106 and 107, respectively, in the slide arm.

Figure 4:
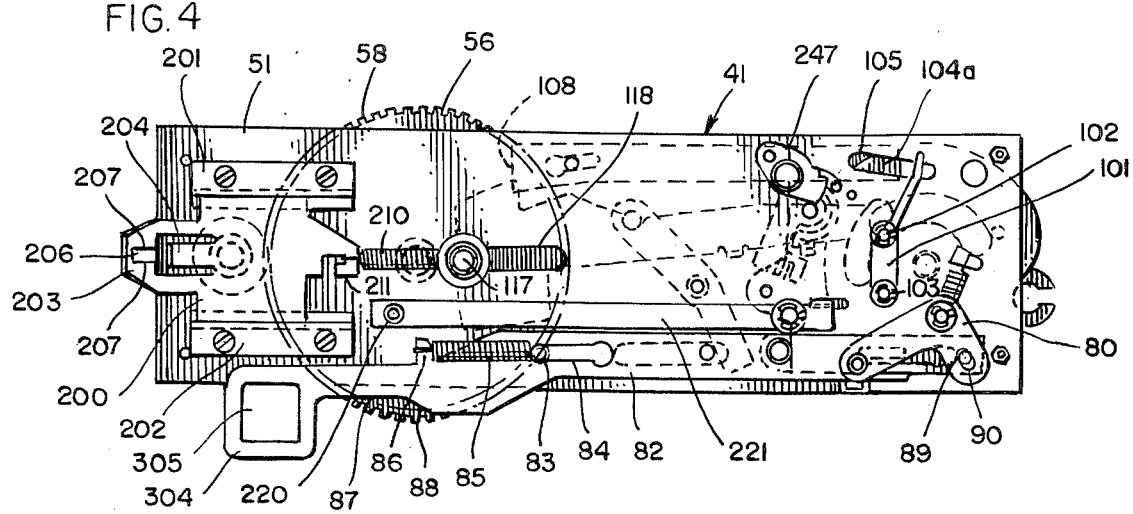
FIG. 4 is a view of the record changer mechanism of FIG. 2.

Clockwise rotation of the bell crank 80 causes counter-clockwise rotation of the lever arm 101, and the slide arm 104 is thereby moved to the left as viewed in FIGS. 4 and 5. This movement of the slide arm 104 causes the left end of the slide arm to engage the flange 70 of the abutment assembly 65 on the cam wheel, and the bell crank 66 (FIG. 6) of the abutment assembly is moved to the position indicated by phantom at 70' in FIG. 6, which, as previously described, moves the abutment 74 into engagement with the boss 62. Thus, it is seen that movement of the control arm 42 into the MAN position and the resultant movement of the link 44 first moves the push button 40 of the switch 39 into the ON position to energize the motor and cause rotation of the turntable and boss and thereafter actuates the abutment means in the cam wheel so that the cam wheel is rotated by the boss. When the operator releases the control arm 42, the spring 85 which biases the switch arm 82 to the right causes slight counterclockwise movement of the bell crank 80 and moves the control arm to the AUTO position. The switch arm is prevented from returning fully to its original or OFF position by the stop member 92.

Referring now to FIGS. 6, 7, and 10, the cam wheel 56 includes a camming groove 111 defined by inner and outer walls 112 and 113, respectively, and a second camming surface 114 extends downwardly beyond the camming groove 111.

A slide bar 116 (FIG. 5) is positioned for sliding movement above the base plate 51 by a pin 117 (FIG. 10) which extends through an elongated slot 118 in the base plate and is provided with a groove for receiving a retaining washer 119. The other end of the slide bar 116 is connected to a tone arm assembly designated generally by the number 121 in FIG. 3.

The tone arm assembly includes support plate 122 which is secured to the base plate 51 of the changer mechanism by three support posts 123 (see also FIGS. 21 and 22). A hollow cylinder or sleeve 124 extends above and below the support plate 122, and a tone arm shaft 125 is rotatably received by the cylinder 124. The upper end of the tone arm shaft is coupled to support bushing 126 (FIGS. 1 and 25) for the tone arm so that the support bushing 126 and the tone arm rotate with the shaft 125. The tone arm is pivotally connected to the support bushing by a pin 127, and the tone arm carries a downwardly extending pin 128 which is supported by a curved support block 129. The block 129 is reciprocably mounted on a housing 130 secured to the frame, and the block is movable upwardly by a pin 131 which extends through the frame 21 and through a curved slot 132 (FIGS. 21 and 24) in the support plate 122 for the tone arm assembly.

Figure 14:
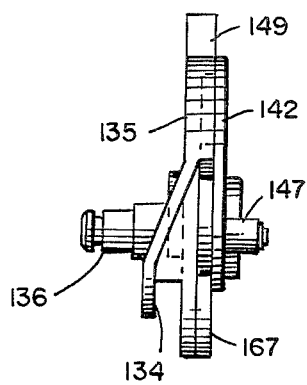
FIG. 14 is a side elevational view of the friction clutch taken along the line 14—14 of FIG. 13.
Figure 13:
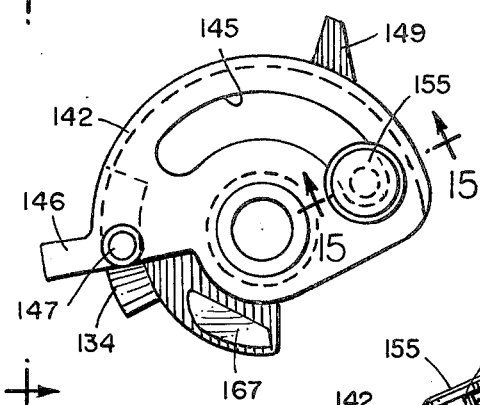
FIG. 13 is a top plan view of the friction clutch of FIG. 11.
Figure 15:
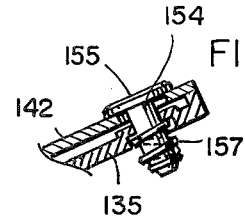
FIG. 15 is a fragmentary sectional view taken along the line 15—15 of FIG. 13.

The lower end of the pin 131 is engageable with a camming ramp 134 (FIGS. 3, 13 and 14) which is formed as part of disc 135. A pin 136 is secured to the disc 135, and the pin 136 is rotatably received by an opening in the end of the slide bar 116. The disc 135 is rotatably mounted on the sleeve 124, and the pin 136 is eccentrically related to the sleeve 124.

The other end of the slide bar 116 carries a cam follower pin 138 (FIGS. 5 and 10) which is received in the camming groove 111 of the cam wheel. As the cam wheel rotates from its starting position illustrated in FIG. 5, the cam follower 138 and the slide bar 116 are first moved longitudinally in a direction away from the axis of rotation of the cam wheel for about one-half of a revolution of the cam wheel and are then returned by the camming groove to the original position. The reciprocation of the slide bar 116 causes the disc 135 to rotate first in a counter-clockwise direction as viewed in FIG. 13 and then in a clockwise direction as the slide bar returns to its original position. As the disc rotates counter-clockwise, the camming ramp 134 forces the pin 131 upwardly to raise the tone arm upwardly about its pivot 127. As the camming ramp returns to its original position, the pin 131 moves downwardly and the tone arm is lowered.

Figure 16:
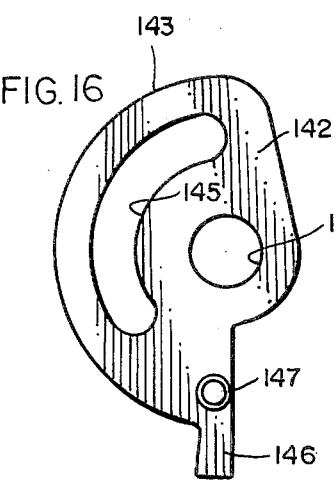
FIG. 16 is a plan view of one of the parts of the friction clutch.
Figure 17:
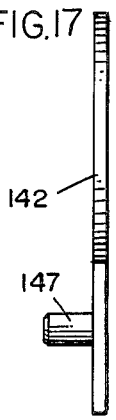
FIG. 17 is a side view of the part of FIG. 16.
Figure 18:
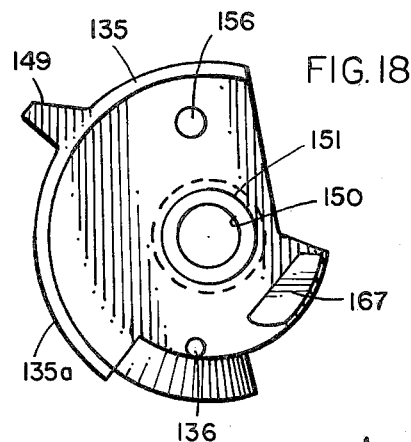
FIG. 18 is a plan view of the other part of the friction clutch.
Figure 19:
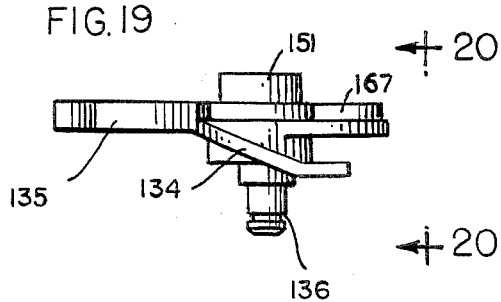
FIG. 19 is a side view taken along the line 19—19 of FIG. 18.
Figure 20:
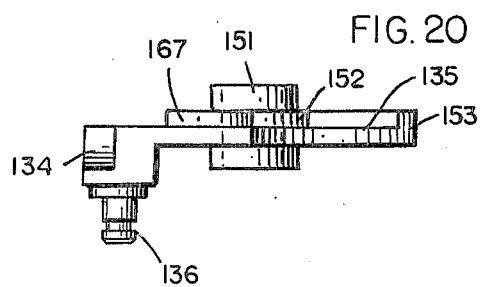
FIG. 20 is a view taken along the line 20—20 of FIG. 19.

The disc 135 forms part of a friction clutch for rotating the tone arm into proper position for playing a record or, after the last record has been played, to rest position. The friction clutch will be explained with reference to FIGS. 13 – 20. A generally semi-circular flat plate 142 (FIGS. 16 and 17) includes a curved outer periphery 143, a center opening 144, and an arcuate slot 145. A finger 146 projects radially outwardly beyond the curved periphery 143, and a pin 147 projects out of the plane of the plate. The disc 135 also includes a curved outer periphery 135a (FIG. 18) having the same radius as the curved periphery 143 of the plate 142, and a finger 149 extends outwardly therefrom. The disc is provided with a center opening 150 for mounting the disc on the shaft 124, and a bushing 151 (FIG. 19) extends upwardly from the plane of the disc and is sized to be inserted through the opening 144 in the plate 142. The bushing includes a radially enlarged shoulder 152 (FIG. 20) for supporting plate 142, and the outer periphery of the plate is supported by an upstanding rim 153 on the disc which projects upwardly from the curved periphery 136.

The plate 142 is coupled to the disc 135 by a pin 154 (FIG. 15) having an enlarged head 155. The pin extends through the arcuate slot 145 in the plate, and an opening 156 in the disc, and the head 155 is resiliently biased against the plate by a spring 157 which is mounted on the pin between the end of the pin and the lower surface of the disc. The pin frictionally connects the disc and the plate so that the plate rotates with the disc unless movement of the disc is restrained by engagement of the finger 146 thereof with an object. When movement of the plate is thereby restrained, the disc can continue to rotate if the force tending to rotate the disc is sufficient to overcome the frictional force between the disc and the plate. The pin 154 will ride in the arcuate slot 145 as the disc rotates relative to the plate.

Referring now to FIG. 21, the support plate 122 for the friction clutch assembly is provided with the arcuate slot 132 and a second shorter slot 160 (see also FIG. 5). A somewhat L-shaped lever arm 161 is pivotally secured to the plate by a pin 162. A cylindrical pin 163 extends downwardly from the lower surface of the lever 160, and the pin 163 is secured to the lever by a pin 164 (FIG. 5) which extends upwardly beyond the upper surface of the lever into the slot 160. The pivoting movement of the lever arm about the pivot pin 162 is restricted by the pin 164 which rides within the slot 160. The pivoting movement of the arm is limited between the positions shown in solid at 161 and in phantom at 161' in FIG. 21. An abutment pin or stop member 165 is also secured to the lower surface of the support plate 122 and extends downwardly therefrom.

The friction clutch is assembled by inserting the assembled disc 135 and plate 142 over the shaft 124 which is mounted on the support plate 122 and inserting the limit pin 147 of the plate 142 through the slot 132 in the support plate so that the pin 147 is positioned between the end of the lever arm 161 and the stop 165.

When the cam wheel 56 and the slide arm 116 are in their original positions illustrated in FIG. 5, the friction clutch assembly is in the position illustrated in FIG. 11. When the cam wheel begins to be rotated by the turntable boss 62, the slide arm 116 moves to the right as viewed in FIG. 5, and the disc 135 begins to rotate clockwise as viewed in FIG. 11 by virtue of the connection of the disc to the slide arm 116 by the pin 136. Clockwise rotation of the plate 142 is prevented by virtue of the engagement between the finger 146 of the plate and the stop pin 165 on the support plate 122. The force exerted on the disc by the slide arm 116 overcomes the frictional engagement between the disc 135 and the plate 142, and the disc rotates with respect to the plate until the slide arm 116 reaches the limit of its sliding movement to the right as viewed in FIGS. 5 and 11. The slide arm 116 will then begin to move to the left, and this movement of the slide arm will rotate the disc 135 counter-clockwise toward its original position. When the disc 135 first begins to rotate counter-clockwise as viewed in FIG. 11, there is no restraining force on the plate 142, and the plate rotates counter-clockwise with the disc 135. As the disc 135 continues to rotate counter-clockwise, an abutment 167 (FIGS. 18 – 20) on the disc will engage the pin 163 on the lever arm 161 and rotate the lever arm 161 clockwise as viewed in FIG. 11. Clockwise rotation of the lever arm 161 will bring the lever arm into engagement with the pin 147 and will overcome the frictional engagement between the plate 142 and the disc 135 and will rotate the plate 142 clockwise as viewed in FIG. 11 until the finger 146 thereof engages the pin 165.

Referring now to FIG. 23, a tone arm shaft assembly 170 includes the elongated support shaft 125 and a base ring 172 secured to the lower end of the shaft. The base ring is provided with a generally C-shaped central opening 173, and three notches 174, 175 and 176 are provided in the outer periphery of the ring. An abutment pin 177 extends upwardly from the base ring, and an abutment finger 178 extends downwardly from the base ring.

After the friction clutch assembly is mounted on the shaft 124 on the support plate 122, the tone arm shaft 125 is inserted through the hollow shaft 124 and is moved upwardly until the abutment pin 177 engages the support plate 122. The base ring 172 is positioned relative to the friction clutch so that the pin 136 on the disc 135 extends downwardly through the central opening 173 as shown in FIG. 24. When the friction clutch is in its original position as shown in FIG. 11, the base ring is free to rotate between positions in which the abutment pin engages the stop finger 149 on the disc 135 and the stop finger 146 on the plate 142.

Referring now to FIGS. 1 and 25, the arcuate block 129 is reciprocably mounted for vertical movement on the housing 130, and the pin 131 extends downwardly from the block through the housing. The block is resiliently biased to a position against the upper surface of the housing by a coil spring 182 which is mounted on the pin 131 between the head 183 thereof and the bottom surface of the housing. The housing is provided with an opening sized to receive the upper end of the shaft 124, and the pin 131 extends through an opening in the frame 21 and through the arcuate slot 132 of the support plate 122 for the friction clutch.

The upper end of the spindle shaft 125 extends upwardly beyond the housing 130, and bushing 126 is inserted over the upper end of the shaft. Referring to FIG. 23 the upper end of the shaft 125 is provided with a pair of diametrically opposed flats 184, and the periphery of the opening in the bushing 126 is provided with correspondingly shaped flats so that the bushing rotates with the shaft. A support arm 186 extends outwardly from the bushing 126 and the tone arm 24 is pivotally secured to the arm 186 by the pin 127. The tone arm can be provided with suitable counter-balancing means so that the desired force is exerted on the record by the needle carried by the tone arm, and the tone arm is supported at the desired inclination relative to the pivot 127 by the support block 129 which supports the pin 128 on the tone arm.

When the record changer is turned off, the tone arm is supported by the post 192 (FIG. 1) which is secured to the frame 21. The friction clutch and the base ring 172 of the tone arm support shaft will be in the positions illustrated in FIGS. 11 and 24. In this position, the pin 131 which extends downwardly from the support block 129 is fully extended through the arcuate slot 132 of the support plate 122, and the abutment pin 177 of the base ring 172 is adjacent the finger 146 of the plate 142.

When the record changer is turned on, the cam wheel will begin to rotate as previously described, and movement of the slide arm 116 by the cam wheel will rotate the disc 135 clockwise as viewed in FIGS. 11 and 24. The camming ramp 134 of the disc will force the pin 131 and the support block 129 upwardly, and this will cause the tone arm 24 to pivot upwardly about its pivot 127. The support block 129 is maintained in a raised position as the disc 135 continues to rotate clockwise, and maximum clockwise rotation will being the finger 149 of the disc into engagement with the abutment pin 177 on the base ring 172.

As the slide arm 116 begins to move back to the left as viewed in FIG. 5, the disc 135 will begin to rotate counter-clockwise, and the plate 142 will rotate with the disc as previously described. Rotation of the plate 142 and the finger 146 which engages the abutment pin 177 on the base ring 172 will also rotate the base ring and the tone arm support shaft 125. As will be described in detail hereinafter, the base ring will be rotated by the finger 146 until one of the teeth 174 – 175 engages a stop member which corresponds to the diameter of the record to be played. Continued rotation of the base ring 172 and the plate 142 is thereby prevented, and the disc 135 continues to rotate relative to these members. When the disc 135 rotates sufficiently to bring the camming ramp 134 below the pin 131, the pin 131 and the support block 129 are allowed to move downwardly. The tone arm 124 moves downwardly with the support block 129 until the needle engages the starting grooves of the record at its outer periphery. The length of the curved support block 129 is sufficient to support the pin 128 on the tone arm throughout the complete movement of the tone arm from its rest position illustrated in FIG. 1 to the position which it reaches when playing of the record is completed.

When playing of the record is completed, the cam wheel 56 is again actuated and the disc 135 is again rotated clockwise as viewed in FIG. 11 by the slide arm 116. Since the tone arm has rotated toward the center of the turntable during playing of the record, the base ring 172 and the abutment pin 177 thereon will have rotated counter-clockwise as viewed in FIG. 24. As the disc 135 is rotated by the slide arm 116, the tone arm will be tilted upwardly from the record by engagement of the camming ramp 134 with the pin 131, and when the finger 149 of the disc 135 engages the abutment pin 177 on the base ring 172, the base ring will rotate with the disc 135 until the base ring is returned to its original position illustrated in FIG. 24.

If another record is to be played, the next record is allowed to drop downwardly along the record spindle 23 to the turntable, and counter-clockwise rotation of the disc 135 will again rotate the tone arm over the record until one of the teeth 174 – 176 engages a stop member which will position the tone arm over the outer periphery of the record.

The records to be played by the record changer are supported by the spindle 23 (FIGS. 1 and 3). The spindle includes an outer housing 195 which is inserted through the hollow shaft 61 secured to the base plate 51 of the record changer assembly and is suitably secured thereto in the conventional manner. The particular spindle illustrated is a conventional umbrella-type spindle which includes a first set of record supporting fingers 196 which normally project outwardly from the spindle housing for supporting the bottom record of a stack and a second set of record supporting fingers 197 which are normally recessed within the spindle housing. Such umbrella type spindles are well known in the art, and a detailed description is unnecessary. Further, although the spindle illustrated is an umbrella-type spindle, other types of record-supporting spindles can be used.

The record-supporting fingers 196 and 197 are operable by an actuating rod or plunger 198 which projects from the bottom of the spindle housing (FIGS. 26–30) and which is reciprocable within the spindle housing. When the actuating rod is retained in the position illustrated in FIG. 26, the upper record-supporting fingers 197 are retracted within the spindle housing, and the stack of records is supported by the lower record-supporting fingers 196. The actuating rod is normally retained in this position by slide plate 200 (FIGS. 4 and 30) which is slidably mounted below the base plate 51 by a pair of tracks 201 and 202 which are secured to the bottom surface of the base plate 51. A central tab portion 203 on the slide plate is inclined downwardly from an edge of the slide plate, and the central portion 204 of the tab is punched downwardly from the tab to provide the tab with central opening 205. The central opening 205 narrows into a slot portion 206 which is defined by a pair of shoulders 207.

The slide plate 200 is biased to the right as viewed in FIG. 4 by a coil spring 210 which extends between a hook portion 211 of the slide plate and the pin 117 which is connected to the slide arm 116 (see also FIG. 10). The coil spring 210 resiliently urges a cam follower pin 212 (FIG. 10) against the cam surface 114 of the cam wheel 56 which extends below the camming groove 111. The cam wheel pin 212 extends upwardly through a slot 213 in the base plate 51.

When the cam wheel is in its starting position illustrated in FIG. 4, the cam follower pin 212 is positioned in the recess or groove 114a (FIG. 7) in the camming surface. When the cam wheel is rotated by the turntable boss, the cam follower pin 212 follows the contour of the camming surface 114 and remains substantially in its original position until it reaches the radially inwardly extending portion 114b of the camming surface after slightly more than 90° of rotation. During this rotation of the cam wheel, the cam follower pin 117 on the slide bar 116 is moved radially outwardly from the axis of rotation of the cam wheel from its original position in the camming groove 111 indicated by the reference numeral 216, thereby tensioning the coil spring 210 which connects the cam follower pin 117 and the slide plate 200. When the cam follower pin 212 on the slide plate reaches the radially inwardly extending portion 114b of the camming surface, the coil spring draws the slide plate toward the axis of rotation of the cam wheel or to the right as viewed in FIGS. 4 and 26 – 29. As the slide plate moves to the right in FIG. 26, the plunger 198 moves downwardly along the inclined tab portion 204. The actuating plunger is spring-biased from its initial position illustrated in FIG. 26 to an intermediate position illustrated in FIG. 27, and when the actuating plunger reaches the position of FIG. 27, the upper set of record-supporting fingers 197 project outwardly from the plunger housing to grip and support the record above the bottom record of the stack. The bottom record continues to be supported by the lower fingers 196, and the weight of this bottom record on the record-supporting fingers 196 causes the actuating plunger, which is connected to the fingers 196, to move downwardly to the position illustrated in FIG. 28. The lower end of the actuating plunger is provided with a pair of grooves 218 which extend parallel to the shoulders 207 forming the slot 206 in the tab portion 203 of the slide plate. Continued movement to the right by the slide plate 200 as the cam follower pin 212 moves radially inwardly along the camming surface of 114b brings the shoulders 207 into engagement with the grooves 218 in the actuating plunger, and continued movement of the slide plate 200 to its final position illustrated in FIG. 29 will cause downward retraction of the actuating plunger as the shoulders slide into the grooves 218. This downward withdrawal of the actuating plunger causes the record-supporting fingers 196 to be retracted into the spindle housing 195, and the bottom record is allowed to drop onto the turntable. The engagement between the tab portion 203 of the slide plate and the actuating plunger stops the sliding movement of the slide plate before the cam follower pin 212 can reach its radially inwardmost position along the camming surface 114b.

After the last record has been played and the cam wheel 56 is rotated by the turntable boss, the sliding movement of the slide plate 200 to the right in FIG. 26 will permit the spring-biased actuating plunger to move downwardly to the position illustrated in FIG. 27. However, further downward movement of the actuating finger depends upon the weight of a record supported on the lower record-supporting fingers 196. When no record is thus supported, the actuating plunger remains in the position illustrated in FIG. 27 as the slide plate continues its movement to the right, and the shoulders 207 will pass below the lower end of the actuating plunger without engaging the grooves 218. The lower end of the actuating plunger is rounded to ensure that the shoulders of the slide plate can pass the plunger, and the plunger may be cammed upwardly somewhat as the shoulders pass. Since rightward movement of the slide plate will not be restrained by engagement of the tab portion 203 with the actuating finger, the slide plate can move toward the axis of the cam wheel until the cam follower pin 212 reaches its radially inwardmost position along the camming surface 114b.

As the slide plate approaches this rightwardmost position, the slide plate will engage a pin 220 (FIG. 4) which extends downwardly from stop bar 221. Referring to FIG. 9, the stop bar is slidably mounted on the lower surface of the support plate 51 by a pin 222 which extends through an elongated slot 223 in the stop bar and is secured to the support plate. Washer 224 retains the stop bar against the lower surface of the plate 51. The end of the stop bar includes a finger 226 which extends upwardly through an elongated slot 227 in the support plate 51 adjacent the nose portion 92a (FIG. 8) of the stop lever 92.

When the record changer is on, the switch arm 82 shown in FIG. 9 is moved to the left of the position illustrated so that the finger 95 engages the shoulder 94 of the switch arm. After the last record has been played and the slide plate 200 moves toward its rightwardmost position and engages the pin 220 on the stop bar 221, the finger 226 on the stop bar moves to the right in FIGS. 8 and 9 and ultimately engages the nose portion 92a of the lever 92. Continued movement of the finger 226 will rotate the lever away from the shoulder 94 on the switch arm 82 and permit the switch arm 82 to move to the right.

The cam follower pin 212 engages the portion 114c (FIG. 7) of the camming surface 114 as the cam wheel continues to rotate, and the cam follower pin is thereby forced radially outwardly from the axis of the cam wheel toward the original position of the cam follower pin. This returns the slide plate 200 to its original position illustrated in FIG. 26, and the central tab 204 of the tab 203 acts as a camming ramp to force the actuating plunger 198 of the spindle upwardly to its initial position of FIG. 26. Upward movement of the actuating plunger causes the lower record-supporting finers 196 to project outwardly from the spindle housing and thereafter causes the upper record-supporting fingers 197 to retract within the spindle housing.

The bottom of the cam wheel 56 is provided with a lug 230 which extends below the camming surface 114 (FIGS. 7 and 10). As the cam wheel approaches its original position, this lug engages the pin 220 of the stop bar 221, which also extends upwardly from the stop bar through a slot 231 (FIG. 5) in the base plate 51. As the cam wheel continues to rotate, the lug 230 moves the stop bar 221 to its original position in which the end finger 226 thereof is positioned as illustrated in FIGS. 8 and 9 away from the nose portion 92a of the lever 92.

After the lever 92 is engaged by the end finger 226 of the stop arm and rotated outwardly to remove the stop finger 95 from engagement with the shoulder 94 on the switch arm 82, the switch arm is still prevented from returning to its original or OFF position by bell crank 234 (FIGS. 5, 31 and 32). The bell crank is pivotally mounted on the base plate 51 by a pin 235 and includes a first lever arm 236 and a second lever arm 237. A pin 238 extends upwardly from the end of the lever arm 236, and when the record changer is off, the pin 238 is positioned in recess 239 in the slide arm 116 as illustrated in FIG. 5. After the record changer has been turned on by movement of the switch arm 82 to the left in FIG. 5, the cam wheel 56 moves the slide arm 116 to the right. This rotates the pin 238 and bell crank 234 counter-clockwise, and the pin moves out of the recess 239. Continued movement of the slide bar 116 brings a curved camming edge 240 of the slide bar into engagement with the pin 238, and the bell crank is rotated by the camming edge into the position illustrated in FIG. 31 when the slide 116 reaches its limit of rightward movement.

The switch arm 82 carries a pin 242 which extends upwardly through an elongated slot 243 in the support plate 51. After the last record has been played and the stop bar 221 is moved to release the stop finger 95 from the shoulder 94 on the switch arm 82, the pin 242 engages the lever arm 237 of the bell crank 234, and the switch arm is thereby prevented from returning to the OFF position of FIG. 5. As the cam wheel continues to rotate toward its original position, the slide bar 116 moves to the left from the position shown in FIG. 31, and the bell crank 234 is allowed to rotate clockwise under the influence of the spring-biased switch arm 82 as the pin 238 rides along the curved edge 240 of the bar 116. The switch arm 82 is thereby gradually allowed to return to its original or OFF position, FIG. 5, and the switch arm ultimately returns to the OFF position as the pin 238 reaches the recess 239 in the bar 116 and moves into the recess. The slide bar 116 and bell crank 234 are shown in FIG. 32 just prior to reaching the OFF position. In this position the camming edge 88 of the switch arm 82 (FIG. 4) permits the switch button 40 (FIG. 2) of the switch 39 to move to its OFF position, and the motor is de-energized. The gradual return of the switch arm 82 which is provided by the movement of the pin 238 along the curved camming dge 240 of the slide bar 116 and the gradual rotation of the bell crank 234 and the ultimate movement of the pin 238 into the recess 239 provides an almost inaudible, silent stop when the record changer is turned off, in contrast to most record changers which turn off with an audible, distracting sound.

As previously described, when the record changer is turned on the camming disc 135 is first rotated in one direction by movement of the slide bar 116 to the right in FIG. 5, and then returned to its original position by movement of the slide bar to the left. Rotation of the camming disc back to its original position causes movement of the finger 146 (FIG. 11) of the friction clutch and rotation of the tone arm shaft assembly (FIG. 23) and the tone arm. The tone arm begins this movement in a position above the support post 192 (FIG. 1) and moves to above the periphery of the record which is to be played. Record size-indicating means operated by the control arm 45 will stop movement of the tone arm when the needle is above the starting grooves of the record, and when the tone arm is lowered by the camming ramp 134 of the friction clutch the needle will engage the starting grooves.

Figure 34:
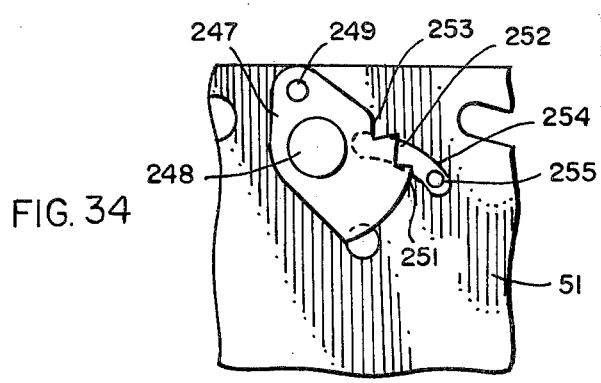
FIG. 34 is a bottom plan view of the structure of FIG. 33.

The control arm 45 is joined to the link 46 (FIG. 2) which is pivotally secured to the base plate 51 by pivot pin 246. A pawl 247 (FIG. 34) is pivotally secured to the base plate 51 below the link 46 (the link being omitted in FIG. 34 for purposes of clarity) the pin 248, and a pin 249 extends downwardly from the pawl through a slot 250 (FIG. 2) in the link 46. The pawl is provided with three teeth 251, 252 and 253, which are rotatable into position below an elongated slot 254 in the base plate 51 to limit movement of a pin 255 to the left as viewed in FIG. 34 in the slot 254.

As the control arm 45 moves in the slot 45a, the link 46 pivots about its pivot pin 246 and, by virtue of the pin 249 and slot 250, pivots the pawl 247 to move one of the teeth 251 – 253 into a limiting position below the slot 254. The housing 43 (FIG. 1) is provided with numerals 7, 10, 12, adjacent the control arm 45 indicating the diameter of the record which is to be played. Movement of the control arm to the position indicated by the numeral 7 moves the tooth 251 of the pawl into position to limit leftward movement of pin 255 in FIG. 34, movement of the control arm to the position indicated by the numeral 10 moves tooth 252 into limiting position, and movement of the control arm to the numeral 12 moves the tooth 253 into limiting position.

Figure 35:
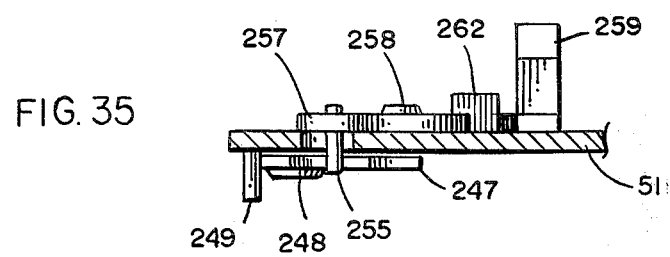
FIG. 35 is an elevational view taken along the line 35—35 of FIG. 33.

The pin 255 is secured to a stop member 257 (FIGS. 33 and 35) which is rotatably secured to the upper surface of the base plate 51 by a pin 258. The stop 257 includes an abutment post 259 which extends upwardly from a relatively flat body portion 260, a C-shaped curved arm portion 261, and a second, lower abutment 262 which extends upwardly from the free end of the arm portion.

Figure 36:
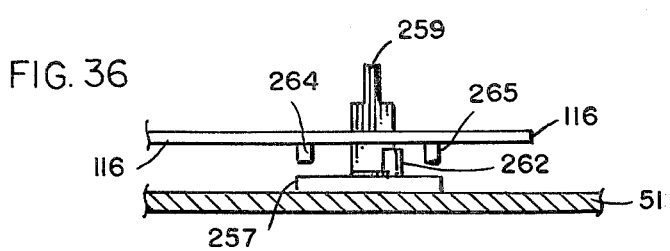
FIG. 36 is an elevational view taken along the line 36—36 of FIG. 33.

The slide bar 116 which is reciprocated by the cam wheel 56 includes a pair of downwardly extending fingers 264 and 265 (FIG. 36). As the slide bar 116 moves to the right as viewed in FIGS. 5 and 36, the finger 264 will engage the lower abutment 262 on the C-shaped arm 261 and cause the stop member 257 to rotate clockwise about its pivot 258 as viewed in FIG. 33. The stop member will be rotated by the finger 264 until the pin 255 carried thereon engages one of the teeth 251 – 253 of the pawl.

Figure 33:
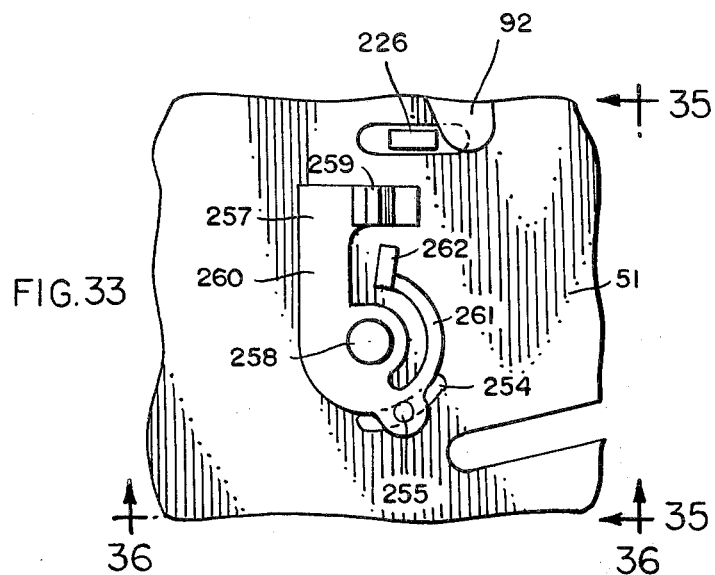
FIG. 33 is a fragmentary top plan view showing part of the record size indicating means.

When the pin 255 engages one of these teeth, rotation of the main body portion 260 of the stop member stops, but the C-shaped arm 261, which is made of flexible resilient material such as plastic, can be flexed to move to the right as viewed in FIG. 33 until the slide bar 116 reaches the limit of its rightward movement in FIG. 5. Rotation of the stop member 257 brings the abutment post 259 into position to engage one of the detents or teeth 174 – 176 on the base ring 172 of the tone arm shaft assembly (FIG. 23).

When the slide bar 116 moves to the left to rotate the cam disc 135 in the other direction, the tone arm shaft assembly will be rotated by the finger 146 of the friction clutch to bring the tone arm over the record to be played. The finger 146 engages the abutment pin 177 on the base ring of the tone arm shaft assembly to rotate the tone arm shaft assembly and the tone arm. Engagement of one of the detents or teeth 174 – 176 with the abutment post 259 will prevent further rotation of the tone arm shaft assembly when the tone arm is properly positioned. Engagement of the abutment post 259 with one of the teeth on the base ring 172 will overcome the frictional force between the plate 142 and the cam disc 135 of the friction clutch, and the disc 135 will rotate relative to the plate 142 and the base ring 172.

As the slide arm 116 continues its movement to the left (FIG. 5), the camming ramp 134 of the disc 135 will allow the tone arm to be lowered so that the needle engages the starting grooves of the record. Thereafter the finger 265 (FIG. 36) on the slide arm will engage the abutment 262 of the stop member 257 and rotate the stop member counter-clockwise as viewed in FIG. 33. This moves the abutment post 259 away from the teeth on the base ring 172 and permits the base ring to rotate freely as the tone arm moves toward the spindle as the record is played.

When 7-inch diameter records are to be played, the control arm 45 is moved to the position illustrated in FIG. 1, and the tooth 251 of the pawl is moved into limiting position below the slot 254. The limited rotation of the stop member will permit the base ring 172 to rotate until the tooth 176 engages the abutment post 259, and the needle of the tone arm will be above the starting grooves of a 7-inch diameter record in this position.

Similarly, when 12-inch diameter records are to be played, the control arm 45 is moved to the position indicated by the numeral 12 in FIG. 1, and the tooth 253 of the pawl is moved into limiting position below the slot 254. The stop member is then allowed to rotate until the pin 255 engages tooth 253, and rotation of the base ring 172 will be limited by engagement of the tooth 174 with the abutment post 259.

Figure 38:
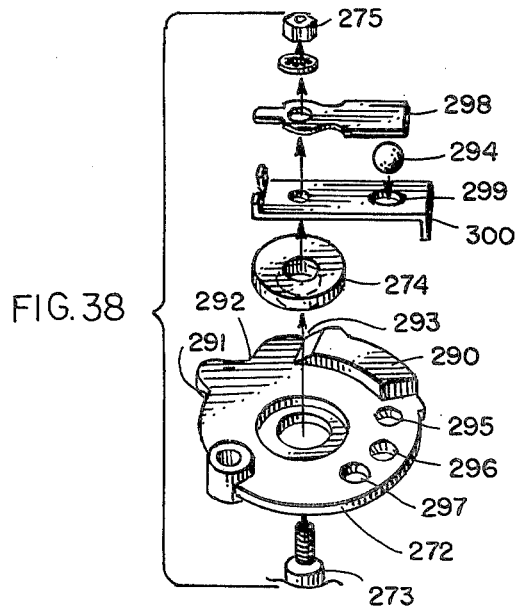
FIG. 38 is an exploded perspective view of a portion of FIG. 37.

Movement of the link 46 by the control arm 45 also causes movement of the link 47 (FIG. 2) which is connected by pin 270 through a curved slot 271 in the frame 21 to cam wheel 272 (FIG. 37). The cam wheel is rotatably secured to the frame 21 by a bolt 273, a washer 274, and nut 275 (FIG. 38). The link 47 is connected eccentrically to the cam wheel 272, and rotation of the cam wheel by the link 47 adjusts the speed of the turntable in accordance with the type of record which is to be played. The turntable is rotated by the rubber drive wheel 29 (FIG. 37), which is rotatably mounted by a pin 276 on a swing arm 277 for engagement with the drive shaft 28 of the motor. The drive shaft has a stepped end portion providing a first portion 279 of a relatively small diameter and a second portion 280 of a larger diameter. The drive wheel 29 is biased into engagement with the drive shaft 28 by a coil spring 281 which is connected to the swing arm 277 and a pin 282 on the frame.

The swing arm 277 is mounted for rotational and reciprocable movement by a shaft 283 which extends through an elongated sleeve or bushing 284 (FIG. 3) mounted on the frame. The shaft 283 is biased downwardly by a coil spring 285 which surrounds the sleeve bushing 284 and which is secured to the lower end of the shaft. The swing arm 277 carries a cam follower pin 286 (FIG. 37) and a detent pin 287, and the cam follower pin 286 is biased downwardly by the spring 285 on the shaft 283 into engagement with the cam wheel 272.

The cam wheel 272 includes a generally flat central portion 288 and a camming ramp 289 which terminates in an arcuate platform 290. The outer periphery of the camming disc 272 is provided with detent grooves 291, 292 and 293 (FIG. 38) which cooperate with the detent pin 287 on the swing arm to provide an audible and sensible position-indicating means.

Another audible and sensible position-indicating means is provided by a detent ball 294 which is resiliently biased into holes 295, 296, and 297 in the cam wheel by a flat spring lever 298. The ball 294 is retained within an opening 299 in rigid bar 300, and the spring lever 298 and the bar 300 are secured against the washer 274 by the nut 275.

When the cam follower pin 286 on the pivot arm 277 engages the central portion 288 of the cam wheel, the drive wheel 29 engages the large diameter portion 280 of the drive shaft. In this position, the detent pin 287 is in the groove 291, and the detent ball 294 is in the hole 295. When the cam wheel is rotated by the link 47 countr-clockwise as viewed in FIG. 37, the camming ramp 289 will force the cam follower pin 286 and the swing arm 277 upwardly, and the support shaft 283 will slide upwardly within the sleeve bushing 284 against the bias of the spring 285. When the cam follower pin 286 is supported by the curved flat platform portion 290 of the cam wheel, the drive wheel 29 will engage the small diameter portion 279 of the drive shaft. Movement of the detent pin 287 into the groove 292 and of the detent ball 294 into the hole 296 will provide an indication of when the drive wheel 29 is properly positioned. Since the links 46 and 47 are connected, these detent means will also provide an indication of when the pawl 247 is properly positioned.

Seven-inch diameter records are generally of the 45 rpm speed and ten-inch and twelve-inch diameter records are generally of 33⅓ rpm. The diameters of the drive wheel 29 and the portions 279 and 280 of the drive shaft 28 are sized relative to each other so that the turntable is driven at a speed of 45 rpm when the drive wheel 29 engages the portion 280 of the drive shaft and is driven at a speed of 33⅓ rpm when the drive wheel engages the portion 279 of the drive shaft.

When the control arm 45 is in the position illustrated in FIG. 1 below the numeral 7, the cam follower pin 286 engages the central portion 288 of the cam wheel just before the camming ramp 289, the detent pin 287 is positioned in the groove 291, and the detent ball is in the hole 296. After further movement of the control arm 45 to the position indicated by the numeral 12, the cam follower pin 286 remains supported by the platform 290 and the drive wheel still engages the portion 279 of the drive shaft. The detent pin 287 is in the groove 293, and the detent ball is in the hole 297.

Although the cam wheel 272 is provided with only two levels for supporting the swing arm and the drive wheel, it will be understood that the turntable can be rotated at three or more speeds if desired. The drive shaft can be provided with a diameter portion corresponding to each speed, and the cam wheel can be provided with a corresponding number of levels each of which are joined by a camming ramp.

The swing arm 277 carries a pin 302 (FIG. 37) which extends through a curved slot 303 in the frame plate 21. The switch arm 82 (FIG. 2) includes a looped end 304 which has a rectangular opening 305. The pin 303 extends into the opening, and when the switch arm is in the OFF position illustrated in FIG. 2, the looped end engages the pin to hold the drive wheel 29 away from engagement of the turntable. When the switch arm is moved to the ON position, the swing arm is allowed to swing under the influence of the spring 281 to bring the drive wheel into engagement with the turntable.

After the tone arm has been brought into the proper position above the starting grooves of the record by rotation of the base ring 172 of the tone arm shaft assembly 170 and is lowered by the camming ramp 134 of the friction clutch, the cam wheel 56 returns to its original position as shown in FIG. 5. The record is then played as the tone arm is moved radially inwardly across the record by engagement of the needle with the record grooves. As the tone arm swings toward the spindle 23, a pin 178 (FIG. 23) which extends downwardly from the base ring 172 approaches the end 104b (FIG. 5) of the slide bar 104. As the needle reaches the final grooves of the record, the pin 178 engages the slide bar 104 and pushes the slide bar to the left as viewed in FIG. 5 to move the bell crank 66 of the abutment assembly 65 so that the abutment finger 74 is engaged by the turntable boss 62 (FIG. 6) as previously described. The cam wheel is thereby rotated by the turntable boss, and the slide bar 116 begins its movement to the right in FIG. 5. Rotation of the cam disc 135 and the camming ramp 134 thereof raises the tone arm above the record, and as the camming disc 135 is rotated by movement of the slide bar 116 to the right, the finger 149 on the camming disc (FIG. 11) engages the pin 177 on the base ring 172 of the tone arm shaft assembly (FIG. 23) and returns the tone arm to a position above the support post 192 (FIG. 1). If another record is supported on the record-supporting fingers 196, the switch arm 82 will be maintained in the ON position by the stop lever 92 (FIG. 8), and the record-supporting fingers 196 will be retracted as the actuating plunger of the spindle is drawn downwardly by the tab 203 of the slide plate 200, thereby allowing the next record to descend to the turntable. As the slide bar 116 moves to the left toward its original position, the friction clutch again moves the tone arm to a starting position above the starting grooves of the record and lowers the tone arm to the record.

After the last record has been played and movement of the cam wheel is initiated by engagement of the slide bar 104 with the pin 178 on the base ring 172 of the tone arm shaft assembly, the rotation of the cam wheel permits the slide plate 200 to move to the right as viewed in FIG. 4 to engage the pin 220 on the slide bar 221 and pivot the stop lever 92 (FIG. 8) to the OFF position. When the finger 226 (FIGS. 8 and 9) on the end of the slide bar 221 is moved to the OFF position, it will engage the finger 179 (FIG. 23) on the base ring 172 and prevent rotation of the tone arm shaft as the cam disc 135 is rotated by movement of the slide bar 116 to the left in FIG. 5. The tone arm will thereby remain over the support post 192, and as the camming ramp 134 permits the tone arm to pivot downwardly, the tone arm will come to rest on the support post 192.

While in the foregoing specification, a detailed description of a specific embodiment of the invention was set forth for purposes of illustration, it will be understood that many of the details herein given may be varied considerably by those skilled in the art without departing from the spirit and scope of the invention.

I claim:

1. An automatic record changer for playing phonograph records comprising:
   a frame (21),
   a turntable (22) rotatably mounted on the frame, the turntable having an upper surface for supporting records to be played and a lower surface and a center opening,
   power means (27) for rotating the turntable,
   switch means (39) for energizing the power means,
   a record spindle (23) received by the center opening of the turntable and secured to the frame, the turntable being rotatable about the spindle,
   a gear (62) secured to the lower surface of the turntable for rotation therewith and having gear teeth on the outer periphery thereof,
   a cam wheel (56) rotatably mounted on a shaft (57) on the frame below the lower surface of the turntable, the cam wheel having a cam groove (111) and a cam surface (114) provided thereon and having gear teeth around substantially the entire outer periphery thereof which are engageable with the gear teeth of the turntable gear whereby rotation of the gear will rotate the cam wheel when their respective gear teeth engage, the cam wheel having a recessed portion (59) in the outer periphery thereof which is not engageable with the gear teeth of the turntable gear whereby the cam wheel will not be rotated by the gear when the recessed portion of the cam wheel faces the gear,
   an elongated tone arm (24),
   a shaft (125) supporting the tone arm and extending generally perpendicularly thereto, the shaft being rotatably mounted on the frame whereby rotation of the shaft moves the tone arm over the outer surface of the turntable,
   an elongated slide bar (116) having a pair of ends and extending in a direction generally perpendicular to the axis of rotation of the cam wheel, a cam follower (138) on one end of the slide bar positioned on the cam groove (111), the cam groove being shaped to slide the slide bar longitudinally from a first to a second position and back to the first position as the cam wheel makes one revolution,
   translating means (135, 142, 170) movably mounted on the frame and operably connected to the other end of the slide bar and to the tone arm shaft (125) for translating sliding movement of the slide bar into rotational movement of the tone arm shaft,
   abutment means (65) movably mounted on the cam wheel (56) and engageable with the turntable gear (62) for rotating the cam wheel when the abutment means engages the turntable gear so that the cam wheel gear teeth engage the teeth of the turntable gear and the cam wheel continues to rotate for one revolution,
   cam start means (104) movably mounted on the frame for moving the abutment means into engagement with the turntable gears,
   a switch arm (82) slidably mounted on the frame,
   start means (44, 80) on the frame for slidably moving the switch arm, the switch arm being engageable with the switch means (39) and being movable by the start means between an off position in which the switch means does not energize the power means and an on position in which the switch means energizes the power means,
   means (85) for resiliently biasing the switch arm to the off position,
   a stop member (92) pivotally mounted on the frame for movement between first and second positions,
   means (97) for resiliently biasing the stop member to its second position in which it is engageable with the switch arm (82) for holding the switch arm in the on position,
   a stop bar (221) slidably mounted on the frame, and
   a slide (200) movably mounted on the frame below the spindle and having a cam-engaging portion engaging the cam surface (114) on the cam wheel (56),
   a spring (210) urging the cam-engaging portion of the slide against the cam surface, the cam surface being shaped to permit movement of the slide between extended and retracted positions as the cam wheel rotates,
   the stop bar (221) being engageable by the slide (200) when the slide moves to its retracted position, engagement of the stop bar by the slide moving the stop bar into engagement with the stop member (92) and pivoting the stop member toward its first position to permit movement of the switch arm to the off position.

2. The structure of claim 1 in which the spring (210) extends between the slide bar (116) and the slide (200) and is connected thereto for resiliently biasing the slide bar and the slide toward each other against the cam groove and the cam surface.

3. The structure of claim 1 including a lever (234) pivotally mounted on the frame, the slide bar (116) having a camming edge (240) engageable with one end of the lever and the switch arm (82) having a pin (242) engageable with the other end of the lever, engagement of the camming edge (240) with the lever causing the lever to hold the switch arm out of the off position until the recessed portion (59) of the cam wheel (56) faces the turntable gear (61).

4. The structure of claim 3 including a pin (238) on said one end of the lever (234), the camming edge of the slide bar being engageable with the pin (238).

5. The structure of claim 1 including a spring resiliently biasing the switch arm to its off position.

6. An automatic record changer for playing phonograph records comprising:
a frame (21),
a turntable (22) rotatably mounted on the frame, the turntable having an upper surface for supporting records to be played and a lower surface and a center opening,
power means (27) for rotating the turntable,
switch means (39) for energizing the power means,
a record spindle (23) received by the center opening of the turntable and secured to the frame, the turntable being rotatable about the spindle,
a gear (62) secured to the lower surface of the turntable for rotation therewith and having gear teeth on the outer periphery thereof,
a cam wheel (56) rotatably mounted on a shaft (57) on the frame below the lower surface of the turntable, the cam wheel having a cam groove (111) and a cam surface (114) provided thereon and having gear teeth around substantially the entire outer periphery thereof which are engageable with the gear teeth of the turntable gear whereby rotation of the gear will rotate the cam wheel when their respective gear teeth engage, the cam wheel having a recessed portion (59) in the outer periphery thereof which is not engageable with the gear teeth of the turntable gear whereby the cam wheel will not be rotated by the gear when the recessed portion of the cam wheel faces the gear,
an elongated tone arm (24),
a shaft (125) supporting the tone arm and extending generally perpendicularly thereto, the shaft being rotatably mounted on the frame whereby rotation of the shaft moves the tone arm over the outer surface of the turntable,
an elongated slide bar (116) having a pair of ends and extending in a direction generally perpendicular to the axis of rotation of the cam wheel, a cam follower (138) on one end of the slide bar positioned in the cam groove (111), the cam groove being shaped to slide the slide bar longitudinally from a first to a second position and back to the first position as the cam wheel makes one revolution,
translating means (135, 142, 170) movably mounted on the frame and operably connected to the other end of the slide bar and to the tone arm shaft (125) for translating sliding movement of the slide bar into rotational movement of the tone arm shaft,
abutment means (65) movably mounted on the cam wheel (56) and engageable with the turntable gear (62) for rotating the cam wheel when the abutment means engages the turntable gear so that the cam wheel gear teeth engage the teeth of the turntable gear and the cam wheel continues to rotate for one revolution,
cam start means (104) movably mounted on the frame for moving the abutment means into engagement with the turntable gears,
a switch arm (82) slidably mounted on the frame,
start means (44, 80) on the frame for slidably moving the switch arm, the switch arm being engageable with the switch means (39) and being movable by the start means between an off position in which the switch means does not energize the power means and an on position in which the switch means energizes the power means,
means (85) for resiliently biasing the switch arm to the off position,
a stop member (92) pivotally mounted on the frame for movement between first and second positions,
means (97) for resiliently biasing the stop member to its second position in which it is engageable with the switch arm (82) for holding the switch arm in the on position,
a stop bar (221) slidably mounted on the frame, and
a slide (200) movably mounted on the frame below the spindle and having a cam-engaging portion engaging the cam surface (114) on the cam wheel (56),
a spring (201) urging the cam-engaging portion against the cam surface, the cam surface being shaped to permit movement of the slide between extended and retracted positions as the cam wheel rotates,
the stop bar being engageable by the slide (200) when the slide moves to its retracted position, engagement of the stop bar by the slide moving the stop bar into engagement with the stop member and pivoting the stop member to permit movement of the switch arm to the off position,
a slide (200) movably mounted on the frame below the spindle, the slide having a plunger-supporting portion, a plunger-engaging portion, and a cam-engaging portion, the cam surface (114) of the cam wheel (56) engaged by the cam-engaging portion of the slide,
a spring (21) urging the cam-engaging portion against the cam surface, movement of the slide by the spring between extended, intermediate, and retracted positions being permitted by the cam surface as the cam wheel rotates,
the spindle (23) including a housing (195), first record support means (196) extendible from the housing for supporting the lowermost record of a stack of records to be played and withdrawable into the housing to permit the lowermost record to drop to the turntable, and second record support means (197) extendible from the housing when the lowermost record is being lowered to the turntable for supporting the remaining records of the stack, and a reciprocable plunger (198) within the housing for operating the first and second record support means, the plunger being movable between a first position in which the first record support means extends from the housing and the second record support means are withdrawn into the housing, second and third positions in which the first record support means extend from the housing and the second record support means extend from the housing, and a fourth position in which the first record support means are withdrawn into the housing and the second record support means extend from the housing, the plunger being maintained in the first position by the plunger-supporting portion of the slide when the slide is in its extended position, movement of the slide toward its intermediate position permitting downward movement of the plunger to its second position, the plunger being movable to its third position by the weight of a record when a record is supported on the first record support means, the plunger-engaging portion of the slide being engageable with the plunger when the plunger is in its third position but not when the plunger is in its second position, the plunger-engaging portion of the slide engaging the plunger when the plunger is in its third position as the slide moves from its extended position toward its retracted position, the slide pulling the plunger downwardly to its fourth position as the slide moves toward its retracted position, engagement of the slide with the plunger preventing movement of the slide to its retracted position, the slide being movable to its retracted position when a record is not supported by the first record support means, the stop bar (221) being engageable by the slide when the slide moves to its third position, engagement of the stop bar by the slide moving the stop bar into engagement with the stop member (92) and pivoting the stop member toward its first position to permit movement of the switch arm to the off position.

7. The structure of claim 6 in which the spring (210) extends between the slide bar (116) and the slide (200) and is connected thereto for resiliently biasing the slide bar and the slide toward each other against the cam groove and the cam surface.

8. The structure of claim 6 in which the slide (200) includes a camming portion (204) for camming the plunger (198) of the spindle (23) upwardly to its first position as the slide is returned to its extended position by the camming surface.

9. An automatic record changer for playing phonograph records comprising:
 a frame (21),
 a turntable (22) rotatably mounted on the frame, the turntable having an upper surface for supporting records to be played and a lower surface and a center opening,
 power means (27) for rotating the turntable,
 switch means (39) for energizing the power means,
 a record spindle (23) received by the center opening of the turntable and secured to the frame, the turntable being rotatable about the spindle,
 a gear (62) secured to the lower surface of the turntable for rotation therewith and having gear teeth on the outer periphery thereof,
 a cam wheel (56) rotatably mounted on a shaft (57) on the frame below the lower surface of the turntable, the cam wheel having a cam groove (111) provided therein and having gear teeth around substantially the entire outer periphery thereof which are engageable with the gear teeth of the turntable gear whereby rotation of the gear will rotate the cam wheel when their respective gear teeth engage, the cam wheel having a recessed portion (59) in the outer periphery thereof which is not engageable with the gear teeth of the turntable gear whereby the cam wheel will not be rotated by the gear when the recessed portion of the cam wheel faces the gear,
 an elongated tone arm (24),
 a shaft (125) supporting the tone arm and extending generally perpendicularly thereto, the shaft being rotatably mounted on the frame whereby rotation of the shaft moves the tone arm over the outer surface of the turntable,
 an elongated slide bar (116) having a pair of ends and extending in a direction generally perpendicular to the axis of rotation of the cam wheel, a cam follower (138) on one end of the slide bar positioned in the cam groove (111), the cam groove being shaped to slide the slide bar longitudinally from a first to a second position and back to the first position as the cam wheel makes one revolution,
 translating means (135, 142, 170) movably mounted on the frame and operably connected to and supporting the other end of the slide bar and connected to the tone arm shaft (125) for translating sliding movement of the slide bar into rotational movement of the tone arm shaft,
 abutment means (65) movably mounted on the cam wheel (56) and engageable with the turntable gear (62) for rotating the cam wheel when the abutment means engages the turntable gear so that the cam wheel gear teeth engage the teeth of the turntable gear and the cam wheel continues to rotate for one revolution,
 cam start means (104) movably mounted on the frame for moving the abutment means into engagement with the turntable gears,
 a plurality of detent means (174-176) mounted on the tone arm shaft for rotation therewith, the detent means being radially spaced from the shaft at varying distances,
 an abutment post member (257) rotatably mounted on the frame below the slide bar (116) and having first and second abutments (259, 262), the slide bar including first and second downwardly extending projections (264, 265) engageable with the second abutment (262), the first projection (264) being engageable with the second abutment as the slide bar moves from its first position to its second position to move the first abutment into a position to engage one of the detent means on the tone arm shaft, the second projection (265) on the slide bar being engageable with the second abutment as the slide bar moves from its second position to its first position to move the first abutment out of engagement with the detent means on the tone arm shaft so that the tone arm shaft can swing toward the spindle as the record is played, the second abutment being mounted on a flexible and resilient arm portion (261) of the abutment post member whereby the second abutment (262) and the slide bar can continue moving after the first abutment reaches the position to engage one of the detent means on the tone arm shaft.

10. The structure of claim 9 including a pin (255) carried by the abutment post member, a pawl (247) movably mounted on the frame and engageable with the pin for limiting rotational movement of the abutment post member in one direction, the pin on the abutment post member being movable into engagement with the pawl as the slide bar moves from its first position to its second position and the first projection (264) thereon moves the second abutment (262).

11. An automatic record changer for playing phonograph records comprising:
 a frame (21),
 a turntable (22) rotatably mounted on the frame, the turntable having an upper surface for supporting records to be played and a lower surface and a center opening,
 power means (27) for rotating the turntable,
 switch means (39) for energizing the power means, a record spindle (23) received by the center opening of the turntable and secured to the frame, the turntable being rotatable about the spindle, a gear (62) secured to the lower surface of the turntable for rotation therewith and having gear teeth on the outer periphery thereof, a cam wheel (56) rotatably mounted on a shaft (57) on the frame below the lower surface of the turntable, the cam wheel having a cam groove (111) provided therein and having gear teeth around substantially the entire outer periphery thereof which are engageable with the gear teeth of the turntable gear whereby rotation of the gear will rotate the cam wheel when their respective gear teeth engage, the cam wheel having a recessed portion (59) in the outer periphery thereof which is not engageable with the gear teeth of the turntable gear whereby the cam wheel will not be rotated by the gear when the recessed portion of the cam wheel faces the gear, an elongated tone arm (24), a shaft (125) supporting the tone arm and extending generally perpendicularly thereto, the shaft being rotatably mounted on the frame whereby rotation of the shaft moves the tone arm over the outer surface of the turntable, an elongated slide bar (116) having a pair of ends and extending in a direction generally perpendicular to the axis of rotation of the cam wheel, a cam follower (138) on one end of the slide bar positioned in the cam groove (111), the cam groove being shaped to slide the slide bar longitudinally from a first to a second position and back to the first position as the cam wheel makes one revolution, translation means (135, 142, 170) movably mounted on the frame and operably connected to the other end of the slide bar and to the tone arm shaft (125) for translating sliding movement of the slide bar into rotational movement of the tone arm shaft, abutment means (65) movably mounted on the cam wheel (56) and engageable with the turntable gear (62) for rotating the cam wheel when the abutment means engages the turntable gear so that the cam wheel gear teeth engage the teeth of the turntable gear and the cam wheel continues to rotate for one revolution, cam start means (104) movably mounted on the frame for moving the abutment means into engagement with the turntable gears, the improvement characterized by the translating means including first and second plate member (135, 142) connected for relative rotation about a common axis, each of the plate members having a central opening (150, 144) aligned with said common axis through which the tone arm shaft (125) extends, spring means (157) for resiliently biasing the plate members together to provide a frictional force tending to rotate the second plate member when the first plate member is rotated, an abutment pin (177) mounted on the tone arm shaft and spaced radially outwardly therefrom, each of the plate members having a radial projection (149, 146) engageable with the abutment pin, the first plate (135) member being secured to the slide bar (116) whereby sliding movement of the slide bar from its first position to its second position rotates the first plate member in one direction from a first position to a second position and sliding movement of the slide bar from its second position to its first position rotates the first plate member in the other direction from its second position to its first position, an abutment (165) on the frame engageable with the second plate member (142) for holding the second plate member in a starting position against said frictional force as the first plate member rotates from its first position to its second position, the projection (149) on the first plate member being engageable with the abutment pin (177) mounted on the tone arm shaft as the first plate member rotates to its second position whereby the tone arm shaft and the tone arm are rotated to a starting position, the projection (146) on the second plate member being engageable with the abutment pin on the tone arm shaft as the first plate member rotates from its second position toward its first position, said frictional force rotating the second plate member and the tone arm shaft to bring the tone arm over the record to be played, record size-indicating means (257) on the frame for overcoming said frictional force and preventing further rotation of the tone arm shaft when the tone arm is over the periphery of the record to be played, a lever (161) mounted on the frame for pivotal movement about an axis parallel to but offset from said common axis of the first and second plate members, an abutment (167) on the first plate member engageable with the lever (161) as the first plate member rotates toward its first position to rotate the lever in the direction opposite to the direction in which the first plate member is moving, and a pin (147) on the second plate member engageable with the lever as the lever is rotated by the abutment (167) whereby the lever overcomes said frictional force and rotates the second plate member to its starting position as the first plate member rotates to its first position.

* * * * *

UNITED STATES PATENT AND TRADEMARK OFFICE
CERTIFICATE OF CORRECTION

PATENT NO. : 4,012,047
DATED : March 15, 1977
INVENTOR(S) : Secundino Rodriquez Sandoval It is certified that error appears in the above-identified patent and that said Letters Patent are hereby corrected as shown below:

In column 17, line 66, "on" should be --in--.

In column 20, line 16, "(201)" should be --(210)--.

Signed and Sealed this

Seventeenth Day of May 1977

[SEAL]

Attest:

RUTH C. MASON
*Attesting Officer*

C. MARSHALL DANN
*Commissioner of Patents and Trademarks*